US012573758B2

(12) United States Patent
Hassan et al.

(10) Patent No.: US 12,573,758 B2
(45) Date of Patent: Mar. 10, 2026

(54) DUAL LINEAR POLARIZED FOLDED STACKED PATCH/MAGNETOELECTRIC ANTENNA FOR COMPACT ANTENNA ARRAY ARRANGEMENTS

(71) Applicant: Analog Devices International Unlimited Company, Limerick (IE)

(72) Inventors: Mohamed Alaaeldin Moharram Hassan, Al Jizah (EG); Islam A. Eshrah, Giza (EG)

(73) Assignee: Analog Devices International Unlimited Company, Limerick (IE)

( * ) Notice: Subject to any disclaimer, the term of this patent is extended or adjusted under 35 U.S.C. 154(b) by 530 days.

(21) Appl. No.: 17/585,713

(22) Filed: Jan. 27, 2022

(65) Prior Publication Data

US 2023/0261381 A1 Aug. 17, 2023

(51) Int. Cl.
*H01Q 9/04* (2006.01)
*H01Q 21/00* (2006.01)
*H01Q 21/24* (2006.01)

(52) U.S. Cl.
CPC ....... *H01Q 9/0414* (2013.01); *H01Q 21/0025* (2013.01); *H01Q 21/24* (2013.01)

(58) Field of Classification Search
CPC .. H01Q 9/0414; H01Q 21/0025; H01Q 21/24; H01Q 5/378; H01Q 21/065; H01Q 9/28
See application file for complete search history.

(56) References Cited

U.S. PATENT DOCUMENTS

| | | | |
|---|---|---|---|
| 8,354,972 | B2 | 1/2013 | Borja et al. |
| 2019/0020110 | A1 | 1/2019 | Paulotto et al. |

(Continued)

FOREIGN PATENT DOCUMENTS

| | | | |
|---|---|---|---|
| CN | 104319467 | A | 1/2015 |
| CN | 111581848 | A | 8/2020 |
| WO | 2021082988 | A1 | 5/2021 |

OTHER PUBLICATIONS

Neetu, Ganga Prasad Pandey, and V. N. Tiwari, "An Overview of Magneto-Electric Dipole Antenna Feed Design", Journal of Advanced Engineering, Management and Science (IJAEMS) [vol. 1, Issue-3, Jun. 2015]. (Year: 2015).*

(Continued)

*Primary Examiner* — Dieu Hien T Duong
(74) *Attorney, Agent, or Firm* — ArentFox Schiff LLP

(57) ABSTRACT

Systems, devices, and methods related to dual linear polarized wideband antennas for compact antenna arrangements are provided. An example antenna structure includes a multi-layered printed circuit board (PCB); a folded magnetoelectric antenna element including a first portion disposed on a first layer of the multi-layered PCB and a first fold portion contiguous to the first portion and extending to at least a second layer of the multi-layered PCB; and a patch antenna element disposed on a third layer of the multi-layered PCB, wherein the first, second, and third layers are separate layers of the multi-layered PCB. The antenna structure further includes a first feeding port electrically coupled to the patch antenna element, and a second feeding port electrically coupled to the patch antenna element, where the first and second feeding ports are associated with different polarizations.

20 Claims, 15 Drawing Sheets

(56) References Cited

U.S. PATENT DOCUMENTS

| | | | |
|---|---|---|---|
| 2021/0126372 A1 | 4/2021 | Duan et al. |
| 2021/0351510 A1 | 11/2021 | Yin et al. |
| 2021/0367358 A1 | 11/2021 | He et al. |
| 2023/0261392 A1 | 8/2023 | Sakr et al. |

OTHER PUBLICATIONS

Chang et al., "A Novel Dual-Polarized Wideband and Miniaturized Low Profile Magneto-Electric Dipole Antenna Array for mmWave 5G Applications," IEEE Open Journal of Antennas and Propagation, Feb. 24, 2021, vol. 2, pp. 326-334.

International Search Report and Written Opinion in PCT/EP2023/052050, mailed Apr. 17, 2023, 17 pages.

Lai et al., "Substrate Integrated Magneto-Electric Dipole Antenna for 5G Wi-Fi," IEEE Transactions on Antennas and Propagation, Dec. 18, 2014, vol. 63, No. 2, pp. 870-874.

Liu et al., *Low-Profile Broadband Magnetoelectric Dipole Antenna With Dual-Complementary Source*, IEEE Antennas and Wireless Propagation Letters, vol. 19, No. 12, Dec. 2020, 5 pages.

Zeng et al., *A Simple Wideband Magneto-Electric Dipole Antenna*, 2018 International Symposium on Antennas and Propagation (ISAP 2018), Oct. 23-26, 2018, Paradise Hotel Busan, Busan, Korea, 2 pages.

Yin et al., *Design of a Dual-Polarized Magnetoelectric Dipole Antenna with Gain Improvement at Low Elevation Angel for a Base Station*, IEEE Antenna and Wireless Propagation Letters, vol. 19, No. 5, May 2020, 5 pages.

Dadgarpour et al., *A Dual-Polarized Magnetoelectric Dipole Array Based on Printed Ridge Gap Waveguide With Dual-Polarized Split-Ring Resonator Lens*, IEEE Transations on Antenna and Propagation, vol. 68, No. 5, May 2020., 8 pages.

English Abstract of CN111581848A, 1 page.

International Search Report and Written Opinion issued in International Patent Application No. PCT/EP2023/053306 on Apr. 18, 2023.

He et al., 28/39-GHZ Dual-Band Dual-Polarized Millimeter Wave Stacked Patch Antenna Array for 5G Applications, 2020 International Workshop on Antenna Technology (iWAT), 4 pages.

Haraz et al., Four-Element Dual-Band Printed Slot Antenna Array for the Future 5G Mobile Communication Networks, Conference Paper, DOI: 10.1109/APS.2015.7304386, Jul. 2015, 3 pages.

Stanley et al., A Dual-Band Dual-Polarised Stacked Patch Antenna for 28 GHZ and 39 GHz 5G Millimetre-Wave Communication, 13th European Conference on Antenna and Propagation (EuCAP 2019), 4 pages.

Elhabbash et al., Design of Dual-Band Dual-Polarized MINO Antenna for mm-wave 5G Base Stations with Octagonal Prism Structure, 978-1-5386-6292-5 (Copyright) 2019, 6 pages.

* cited by examiner

DUAL LINEAR POLARIZED FOLDED STACKED PATCH/MAGNETOELECTRIC ANTENNA FOR COMPACT ANTENNA ARRAY ARRANGEMENTS

TECHNICAL FIELD OF THE DISCLOSURE

The present disclosure generally relates to electronics and, more particularly, to antennas used in radio frequency (RF) systems.

BACKGROUND

RF systems are systems that transmit and receive signals in the form of electromagnetic waves with a frequency range of approximately 3 kilohertz (kHz) to 300 gigahertz (GHz). RF systems are commonly used for wireless communications, with cellular/wireless mobile technology being a prominent example.

In the context of RF systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave to produce an electric current at its terminals, where the electric current is subsequently applied to a receiver to be amplified. Antennas are essential components of all radio equipment, and are used in radio broadcasting, broadcast television, two-way radio, communications receivers, radar, cell phones, satellite communications and other devices.

An antenna with a single antenna element may broadcast a radiation pattern that radiates equally in all directions in a spherical wavefront. Phased array antennas may generally refer to a collection of antenna elements that are used to focus electromagnetic energy in a particular spatial direction, thereby creating a main beam. Phased array antennas may offer numerous advantages over single antenna systems, such as high gain, ability to perform directional steering, and simultaneous communication. Therefore, phased array antennas may be used more frequently in a myriad of different applications, such as in military applications, mobile technology, on airplane radar technology, automotive radars, cellular telephone and data, and Wi-Fi technology.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
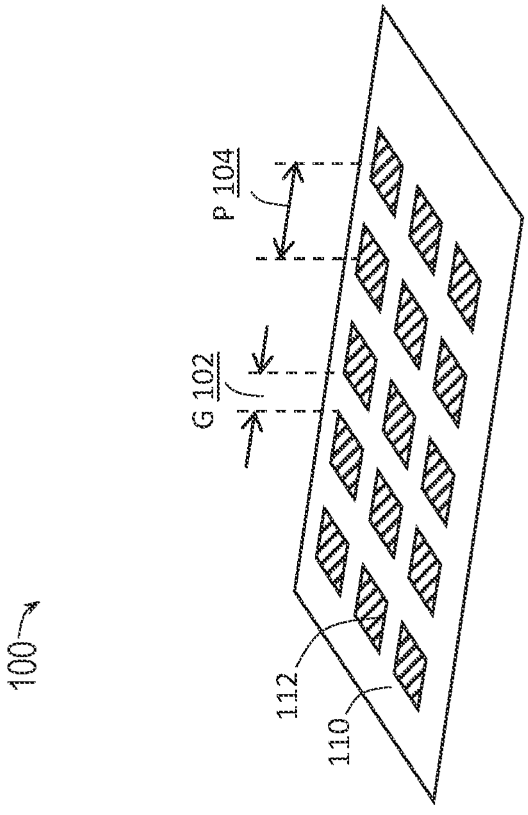
FIG. 1 illustrates an exemplary antenna array arrangement.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

As described above, phased array antennas may generally refer to a collection of antenna elements that are used to focus RF energy in a particular direction, thereby creating a main beam. In particular, the individual antenna elements of a phased array antenna may radiate in a spherical pattern, but, collectively, a plurality of such antenna elements may be configured to generate a wavefront in a particular spatial direction through constructive and destructive interference. The relative phases of the signal transmitted at each antenna element can be either fixed or adjusted, allowing the antenna system to steer the wavefront in different spatial directions. In an example, a phased array antenna system may include an oscillator, a plurality of antenna elements, a phase adjuster or shifter, a variable gain amplifier, a receiver, and a control processor. The phased array antenna system may use the phase adjusters or shifters to control the phase of the signal transmitted by each of one or more of its antenna elements. The radiated patterns of the antenna elements may constructively interfere in a target direction creating a wavefront in that direction called the main beam (also referred to as "lobe"). In this way, the phased array antennas can realize increased gain and improve signal to interference plus noise ratio in the direction of the main beam. The radiation pattern may destructively interfere in several other directions other than the direction of the main beam and thus can reduce gain in those directions.

"Beam scanning" may refer to changing (i.e., scanning) the direction of the main beam of an antenna element. In this context, the term "broadside" refers to the direction of the main beam that is perpendicular to the plane of the antenna element. With fifth generation cellular (5G) (e.g., millimeter-wave (mm-wave) technology) applications, there is a need for aggressive scan angles that might go up to at least 70 degrees away from the broadside (in the following, the term "scan angle" refers to the angle between the direction of the main beam of an antenna element and the broadside).

In an example, a phased antenna array may include a plurality of antenna elements arranged in one or more columns and one or more rows spaced apart from each other on a printed circuitry board (PCB) or any suitable support structure. To provide a wide or large scanning angle, the inter-element pitch between adjacent antenna elements is to be small (e.g., about half of a resonant wavelength). As such, a wide or large scan angle antenna array may include closely spaced antenna elements. Further, in some examples, it may be desirable to have a certain inter-element spacing or gap to reduce or avoid coupling (mutual coupling) between antenna elements and/or allow room for assembly (e.g., when the antenna elements are individual surface mount technology (SMT) components). That is, to achieve a large scan angle, it may be desirable to design antenna elements with a size (or dimension) as small as possible so that they can fit into a wide scan range antenna array. However, an antenna element of a smaller size may support a narrower bandwidth. Accordingly, it may be challenging to design antennas or antenna elements that are small enough to fit into an antenna array that can provide a wide scan range while also supporting a wide bandwidth. A wideband antenna may refer to an antenna that can cover a frequency band of interest with a fractional bandwidth of about 9% to about 25%, where a fractional bandwidth may be defined as the absolute bandwidth divided by the center frequency. A wide scan angle or wide scan range antenna array may refer to an antenna array that can provide a scan angle up to about 70 degrees in both the azimuth direction and the elevation direction.

Further, some RF systems may desire to utilize dual linear polarized antennas for transmissions and/or receptions. For instance, a wireless communication system (e.g., a 5G system) may transmit or receive two independent data streams at the same time using two orthogonalized polarized signals (e.g., one in a horizonal (H)-polarization and another in a vertical (V)-polarization) to increase system throughput. Alternatively, a wireless communication system may transmit or receive the same data stream using two orthogonalized polarized signals for diversity gain. A V-polarization may refer to the oscillation of an antenna's electrical field in a vertical plane and an H-polarization may refer to the oscillation of the antenna's electrical field in a horizontal plane perpendicular to the vertical plane.

The present disclosure provides compact, wideband, dual linear polarized antenna structures or elements that can fit into a wide scan range antenna array. The disclosed antenna structures or elements are based on a combination (or "fusion") of folded magnetoelectric antenna and patch antenna arranged (e.g., printed) on a multi-layered PCB. The magnetoelectric antenna can operate over a wide bandwidth while the folding of the magnetoelectric antenna reduces the dimension of the antenna structures so that the antenna structures are small enough (in size) to fit as radiating elements in wide scan range phased antenna arrays. The patch antenna may serve as a symmetric driver that can be excited by direct probes or cross-slots to provide dual linear polarization. In one aspect of the present disclosure, an example antenna structure may include a multi-layered PCB with a folded magnetoelectric antenna element and a patch antenna element. The multi-layered PCB may include layers that are stacked vertically. The folded magnetoelectric antenna element may include a plurality of patches disposed on a first layer (e.g., a top layer) of the multi-layered PCB, for example, to form electric dipoles. Further, each magnetoelectric antenna patch may be shorted to a ground layer of the multi-layered PCB to form magnetic dipoles. One or more edges (or extents) of each patch of the plurality of patches may be folded (to reduce the dimension of the antenna structure) and may extend vertically to at least a second layer of the multi-layered PCB. As an example, a first patch of the plurality of patches may include a first portion (e.g., a planar portion) disposed on the first layer, a first fold portion contiguous to the first portion and extends vertically towards the second layer, and a second fold portion contiguous to the first fold portion and disposed on the second layer. The patch antenna element may be disposed on a third layer of the multi-layered PCB. The first, second, and third layers are separate layers of the multi-layered PCB, where the second layer may be vertically below the first layer, and the third layer may be vertically below the second layer.

In some aspects, to further reduce the dimension of the antenna structure, the first fold portion of the first patch (of the magnetoelectric antenna element) may further extend to the third layer of the multi-layered PCB. When the first fold portion is extended to the third layer, the first patch can further include a third fold portion contiguous to the first fold portion and disposed on the third layer.

In some aspects, an outer edge of the first patch (of the magnetoelectric antenna element) may be folded to form the first fold portion. That is, the first fold portion may extend along a side of the antenna structure. In some aspects, an inner edge of the first patch is folded to form the first fold portion. That is, the first fold portion may extend vertically within the antenna structure (e.g., along a middle plane of the antenna structure). In some aspects, both the outer edge and the inner edge of the first patch can be folded. In some aspects, each of the plurality of patches (of the magnetoelectric antenna element) may be folded at one or more outer edges and/or at one or more inner edges. In an example, the number of patches in the plurality of patches may be 4, and each patch may be disposed on a different quadrant of the first layer and spaced apart from each other. A parasitic capacitance may be formed from the spaced apart magnetoelectric antenna patches. The folding at the inner edges of the patches increases the capacitance area, thereby increasing the capacitance of the magnetoelectric antenna element. The resonant frequency of an antenna is inversely proportional to the square root of its capacitance. As such, the increase of the capacitance from the folding at the inner edges of the patches can lower the resonant frequency of the magnetoelectric antenna element without increasing the dimension of the antenna structure.

In some aspects, each of the plurality of patches (of the magnetoelectric antenna element) may be connected to the ground layer of the multi-layered PCB by at least two staggered vias (e.g., electrical connection elements). For instance, a first via may extend from the first layer of the multi-layered PCB to the second layer of the multi-layered PCB, and a second via may extend from the second layer to the ground layer.

In some aspects, the antenna structure may include a first feeding port and a second feeding port electrically coupled to the patch antenna element, where the first feeding port may be associated with a first polarization (e.g., H-polarization) and the second feeding port may be associated with a second polarization (e.g., V-polarization) different from the first polarization. To provide symmetric dual polarization, each of the first feeding port and the second feeding port may be positioned symmetrically (e.g., at about a middle location) along a corresponding edge or side of the antenna structure. In this way, the antenna structure can be positioned in any orientation (e.g., with arbitrary assembly rotation) and still provide the same dual polarization performance.

In some aspects, a side dimension of the folded magnetoelectric antenna element may be between about 0.25 of a wavelength and about 0.3 of a wavelength. In some aspects, the layers of the multi-layered PCB may be spaced apart from each other by dielectric material having a dielectric constant between about 3 and about 4. In some aspects, the multi-layered PCB may include a PCB core that separates the first, second, and third layers from ground layer(s) of the PCB, where the PCB core can have a height between about 0.05 of a free-space wavelength and about 0.2 of a free-space wavelength. In some aspects, it may be desirable to arrange the PCB layers to be symmetrical around the PCB core (e.g., to prevent warping during assembly and allow for mass-manufacturability). To that end, the multi-layered PCB may include a fourth, a fifth, and a sixth layers spaced apart from the first, second, and third layers by the PCB core.

In a further aspect of the present disclosure, a phased antenna array apparatus may include a plurality of antenna elements, each constructed with a folded magnetoelectric antenna element and a patch antenna element arranged (or printed) on a multi-layered PCB as discussed herein. The folding of the magnetoelectric antenna element (e.g., at the inner edge(s) and/or outer edge(s) of the patches) can reduce the size or side dimension of the antenna elements so that the antenna elements can be arranged closed to each other (e.g., with a pitch of half of a resonant wavelength or less) at the array to provide a wide scan range (e.g., with an azimuth scan angle up to about ±70 degrees and an elevation scan angle up to about ±70 degrees).

The systems, schemes, and mechanisms described herein advantageously provides compact, wideband antenna structures based on a folded magnetoelectric antenna element and a patch antenna element stacked and printed on a multi-layered PCB. The compact footprint enables the antenna structures to be fitted into a wide scan range antenna array. That is, the disclosed antenna structure is suitable for use to provide wideband, wide scan range antenna arrays. For example, the disclosed antenna structure may have a side dimension between about 0.25 to about 0.3 of a resonant wavelength and may provide a fractional bandwidth up to about 25%, and may fit into a phase antenna array that provides a scan angle up to about 70 degrees in both azimuth and elevation. Additionally, folding inner edges of the patches of the magnetoelectric antenna element can lower a resonant frequency of an antenna element without increasing the dimension or footprint of the antenna element. Further, utilizing a symmetric feeding structure (the symmetric excitation for dual polarization) with the patch antenna element can enable the disclosed antenna structures to provide symmetric radiation patterns for H-polarization and V-polarization. This can advantageously allow for arbitrary assembly rotation of these antenna elements without impacting dual polarization performance. The disclosed antenna structures may be suitable for use in a printed antenna array or an SMT antenna array and may be compatible with high-volume manufacturing (HVM) capabilities.

Example Antenna Arrays

FIG. 1 illustrates an exemplary antenna array arrangement 100. The antenna array arrangement 100 may be suitable for use in an RF system for wireless transmission and/or reception. The antenna array arrangement 100 may also be used in conjunction with phase shifters to provide beam steering (e.g., as shown in the antenna apparatus 800 of FIG. 8). As shown in FIG. 1, the antenna array arrangement 100 is a printed antenna array including a plurality of antenna elements 112 printed on a PCB 110. The antenna elements 112 may be arranged in columns and rows and spaced apart from each other. For simplicity, FIG. 1 illustrates the printed antenna array as a 3-by-5 antenna array (e.g., with antenna elements 112 arranged in 3 rows and 5 columns). However, a printed antenna array can include any suitable number of antenna elements (e.g., about 4, 8, 16, 64, 256, 1024 or more) and may be arranged in any suitable configuration. The PCB 110 may be a structure with alternating conductive layers (e.g., made of conductive materials such as copper) and insulating layers (e.g., made of dielectric materials). A conductive layer may include patterns of conductive traces (e.g., flat narrow tracks of conductors) to provide electrical connections on that layer and/or patterns of antennas elements as shown. In general, a PCB may have any suitable number of conductive layers (e.g., about 2, 3, 4, 5 6, 7, 8, 9, 10, 11, 12 or more).

To achieve a wide scan angle, the inter-element pitch 104 (e.g., represented by P) may be half a resonant wavelength (e.g., represented by $\lambda_0$). That is, the antenna elements 112 may have a small size and may be arranged close to each other in a wide scan angle antenna array. Further, it may be desirable to arrange the antenna elements 112 with a certain inter-element spacing or gap 102 (e.g., represented by G) to reduce or avoid mutual coupling (parasitic coupling) between adjacent elements 112. In some examples, the inter-element spacing or gap (e.g., the gap 102) in a printed antenna array may be limited by the shape-to-shape spacing from a manufacturing point of view.

Figure 2:
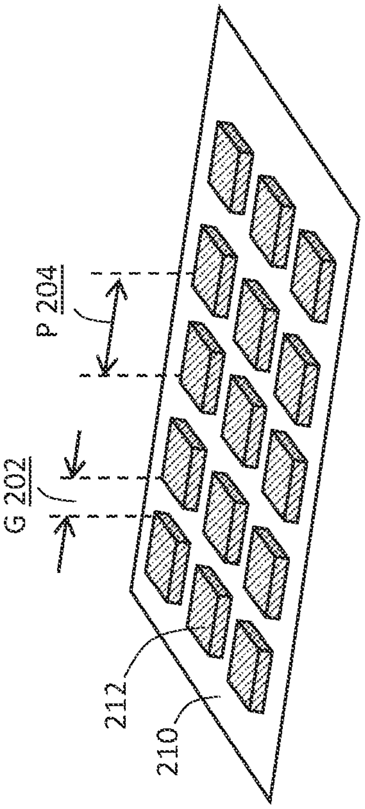
FIG. 2 illustrates an exemplary antenna array arrangement.

FIG. 2 illustrates an exemplary antenna array arrangement 200. The antenna array arrangement 200 may be suitable for use in an RF system for wireless transmission and/or reception. The antenna array arrangement 200 may also be used in conjunction with phase shifters to provide beam steering (e.g., as shown in the antenna apparatus 800 of FIG. 8). As shown in FIG. 2, the antenna array arrangement 200 includes a plurality of individual SMT antenna elements 212 mounted (or soldered) onto a PCB 210. The SMT antenna elements 212 may be arranged in columns and rows and spaced apart from each other. For simplicity, FIG. 2 illustrates the SMT antenna array as a 3-by-5 antenna array (e.g., with antenna elements 212 arranged in 3 rows and 5 columns). However, an SMT antenna array can include any suitable number of antenna elements (e.g., about 4, 8, 16, 64, 256, 1024 or more) and may be arranged in any suitable configuration. The PCB 210 may be substantially similar to the PCB 110. To support the mounting or soldering of the SMT antenna elements 212, the PCB 210 can further include conductive pads to accept component terminals.

Similar to the arrangement 100, to achieve a wide scan angle, the antenna elements 212 are to be small in size so that they can be arranged with a small inter-element pitch 204, (e.g., of about $\lambda_0/2$). Further, it may be desirable to arrange the antenna elements 212 with a certain inter-element spacing or gap 202 (e.g., represented by G) to reduce or avoid mutual coupling between adjacent elements 212. In some examples, the inter-element spacing or gap (e.g., the gap 202) in an SMT antenna array may be limited by the assembly clearance capability and/or SMT component packaging guidelines or rules. In some examples, the gap 202 may be at least 1.5 millimeter (mm) to allow for assembly of the antenna elements 212 onto the PCB 210.

As discussed above, the operating bandwidth of an antenna element may be dependent on its size where the larger the antenna element size, the wider its operating bandwidth. For printed antenna arrays such as the antenna array arrangement 100, the antenna elements can extend laterally. For instance, a printed antenna array can include stacked patched, magnetoelectric antennas having a sufficiently large size to provide wide bandwidth operations. However, this can increase the footprint and thus may not allow the antenna array to operate over a wide scan range. For SMT antenna array such as the antenna array arrangement 200, the antenna elements can extend vertically. For instance, an SMT antenna array can be constructed from dielectric resonator antennas (e.g., ceramic based antennas). However, the vertical extension may cause the SMT antenna component to exceed the dimension (e.g., height) allowed by SMT packaging guidelines or rules. Hence, magnetoelectric antennas may have limited usability for wideband SMT antennas.

Further, as mentioned above, some RF systems may desire to utilize dual linear polarized antennas for transmissions and/or reception. While stacked patch antennas can support symmetric excitation for dual polarization and operate over a wide bandwidth, the wide bandwidth capability may be loss when stacked patch antennas are placed in SMT components. This is because a stacked patch antenna may typically have to be truncated (in size, area) in order to be placed in an SMT component. The truncation of stacked patch antennas may cause an undesirable dip (a lower antenna gain) in the middle of the wide bandwidth, thus destroying the wide bandwidth capability. Hence, stacked patch antennas may have limited usability for wideband SMT antennas.

Accordingly, it may be challenging to design printed or SMT antennas or antenna elements that are small enough to fit into an antenna array to provide a wide scan range but also support a wide bandwidth and provide symmetric dual polarization performance.

Figure 3A:
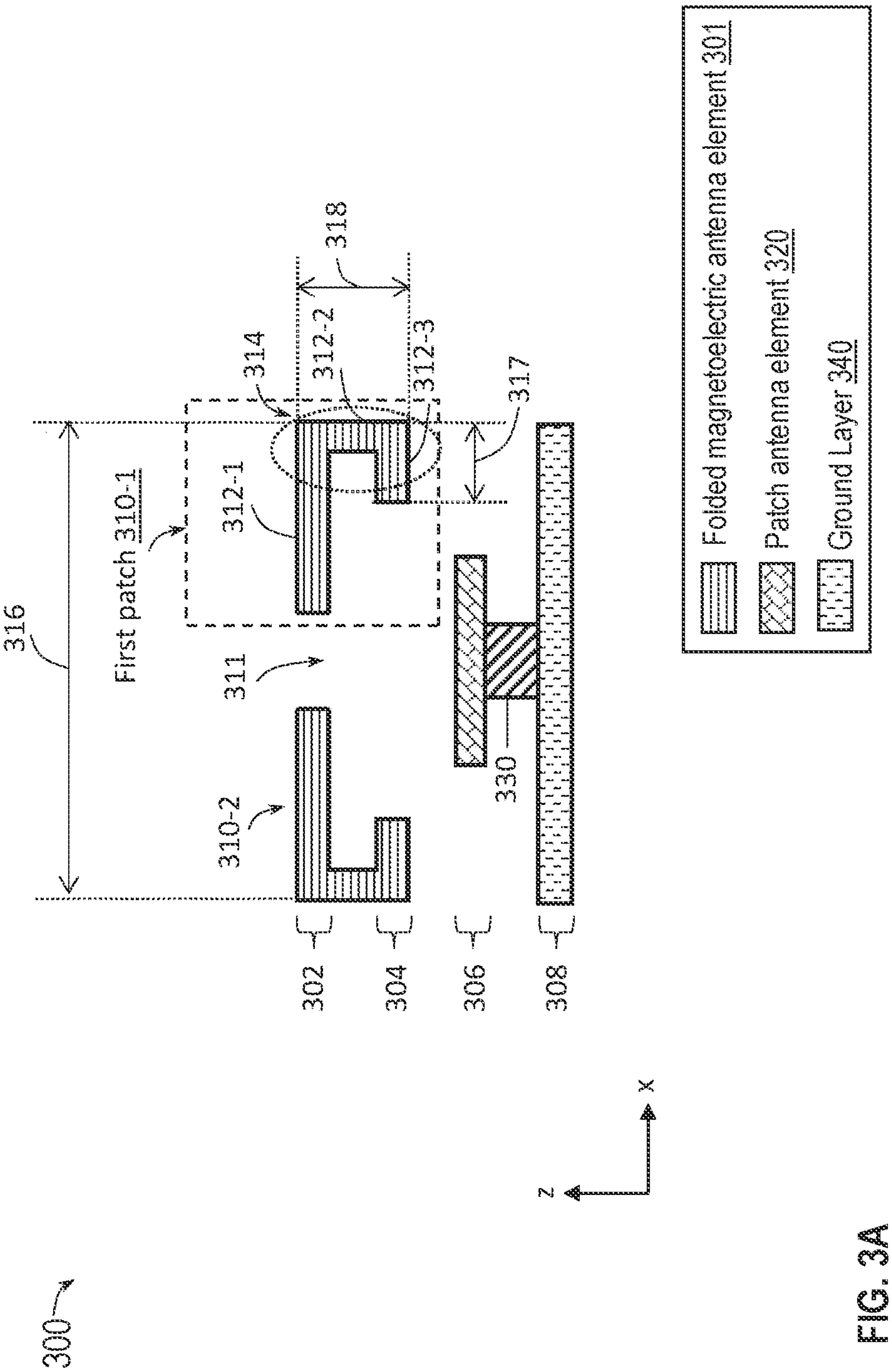
FIG. 3A is a cross-sectional view of an exemplary compact, wideband antenna structure, according to some embodiments of the present disclosure.
Figure 3B:
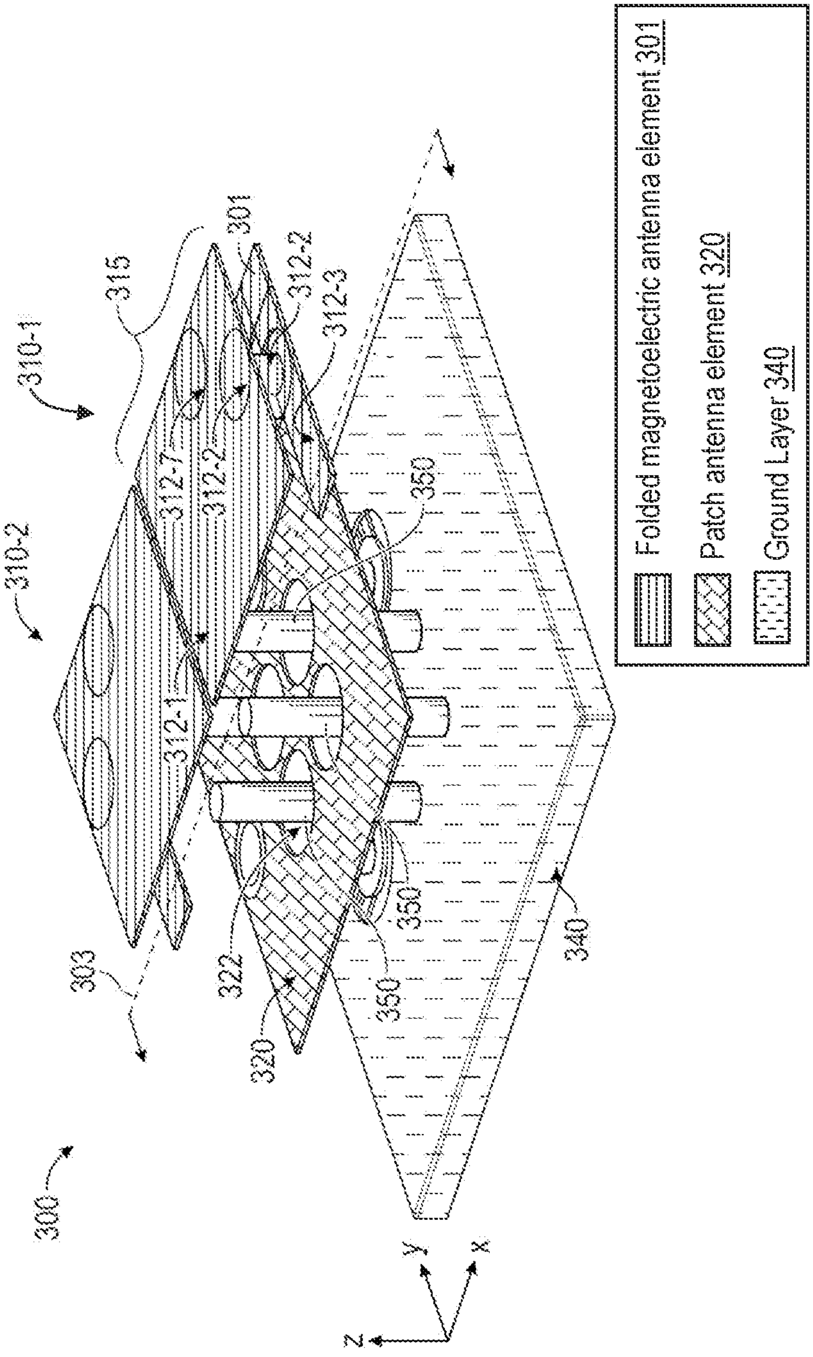
FIG. 3B is a perspective view of an exemplary compact, wideband antenna structure, according to some embodiments of the present disclosure.

Example Compact, Wide Band, Dual Linear Polarized Antenna Structures, Elements, and Devices FIGS. 3A and 3B are discussed in relation to each other to illustrate an exemplary wideband antenna structure 300 with a compact footprint that can fit into an antenna array (e.g., similar to the antenna array arrangements 100 and/or 200) to provide a wide scan angle. As discussed above, a wideband antenna may refer to an antenna that can cover a frequency band of interest with a fractional bandwidth of about 9% to about 25%. As an example, a 5G system a center frequency at about 30 GHz (e.g., N257, N258, and/or N259 bands) with a bandwidth of about 3 GHz. That is, a fractional bandwidth of about 10%.

FIG. 3A is a cross-sectional view of the compact, wideband antenna structure 300, according to some embodiments of the present disclosure. FIG. 3B is a perspective view of the compact, wideband antenna structure 300, according to some embodiments of the present disclosure. The antenna structure 300 may be suitable for use in an RF system for wireless transmission and/or reception. In some examples, the antenna structure 300 may be part of a phased antenna array (e.g., the antenna array arrangements 100 and/or 200), which may be used in conjunction with phase shifters to provide beam steering (e.g., as shown in the antenna apparatus 800 of FIG. 8). The cross-sectional view of FIG. 3A may be taken along the line 303 of FIG. 3B.

As shown in FIG. 3A, the antenna structure 300 includes a folded magnetoelectric antenna element 301 and a patch antenna element 320. The folded magnetoelectric antenna element 301 and the patch antenna element 320 may be printed on a multi-layered PCB. The multi-layered PCB may include a plurality of conductive layers (e.g., at least a first layer 302, a second layer 304, a third layer 306, and a fourth layer 308) spaced apart from each other by dielectric materials and stacked vertically (e.g., along a direction of the z-axis). For simplicity, FIG. 3A only illustrate the conductive layers (the first layer 302, the second layer 304, the third layer 306, and the fourth layer 308) and not the dielectric or insulating layers. A more detailed structure of the multi-layered PCB is shown and discussed below with reference to FIG. 6.

The folded magnetoelectric antenna element 301 may include a plurality of patches 310 (shown as 310-1 and 310-2) spaced apart from each other by a gap 311 to form electric dipoles and each magnetoelectric antenna patch 310 may be electrically coupled (or shorted) to a ground potential or ground layer 340 (e.g., the fourth layer 308) of the multi-layered PCB to form magnetic dipoles. Mechanisms for shorting or connecting the patches 310 to ground will be discussed more fully below with reference to FIG. 3B. In some aspects, the folded magnetoelectric antenna element 301 may include four patches 310, each located at a different quadrant of the first layer 302 (e.g., as shown in FIG. 5C). The magnetoelectric antenna patches 310 may be made of any suitable electrically conductive material. To reduce the size or a side dimension of the magnetoelectric antenna element 301, one or more outer edges (or extents) of each magnetoelectric antenna patch 310 may be folded and may extend vertically to at least the second layer 304 of the multi-layered PCB. When each patch 310 has a square shape or rectangular shape and located in a different quadrant of the first layer 302, each patch may include two adjacent outer edges (each extending along a side of the first layer 302 of the antenna structures 300) and two adjacent inner edges (each extending from a side of the first layer 302 towards the center of the first layer 302).

In FIG. 3A, the cross-sectional view shows a first magnetoelectric antenna patch 310-1 and a second magnetoelectric antenna patch 310-2. For simplicity, only portions of the first magnetoelectric antenna patch 310-1 are labeled in FIG. 3A and described below. However, analogous descriptions may be applied to other magnetoelectric antenna patches 310 (e.g., the second magnetoelectric antenna patch 310-2). As shown, the first magnetoelectric antenna patch 310-1 includes a first portion 312-1, a first fold portion 312-2, and a second fold portion 312-3. The first portion 312-1 may be disposed (e.g., printed) on the first layer 302 and may have a square shape or a rectangular shape. The first fold portion 312-2 may be contiguous to the first portion 312-1 and may extend vertically to the second layer 304 along a direction of the z-axis. The second fold portion 312-3 may be contiguous to the first fold portion 312-2 and disposed (e.g., printed) on the second layer 304. In other words, a first outer edge or outer extent 314 of the first magnetoelectric antenna patch 301-1 is folded along a side of the antenna structure 300 to form the first fold portion 312-2 (a vertical fold portion) and the second fold portion 312-3 (a horizonal fold portion which may also be referred to as a folded magnetoelectric antenna arm). The folding with the first fold portion 312-2 and the second fold portion 312-3 may be referred to as 2X folding. In a similar way, an outer edge or outer extent the second magnetoelectric antenna patch 310-2 may be folded along a side of the antenna structure 300. Thus, the antenna length (or resonant length) (e.g., Lr) of the magnetoelectric antenna element 301 may include not only the side dimension 316 (e.g., L1) but also additional lengths from the fold portions of the magnetoelectric antenna patches 310-1 and 310-2. For instance, the vertical fold portion 312-2 of the first magnetoelectric antenna patch 310-1 has a length 318 (e.g., L2), the horizontal portion 312-3 of the first magnetoelectric antenna patch 310-1 has a length 317 (e.g., L3), and the second magnetoelectric antenna patch 310-2 has similar fold portions with similar lengths as the first magnetoelectric antenna patch 310-1. As such, the antenna length Lr may be L1+2×(L2+L3) . . . . That is, the magnetoelectric antenna element 301 may have an effective radiating length Lr longer than the side dimension 316 (which may correspond to a side dimension of the antenna structure 300). Accordingly, the folding enables the magnetoelectric antenna element 301 to support a wide bandwidth with a compact footprint.

The patch antenna element 320 may be disposed (e.g., printed) on the third layer 306. The patch antenna element 320 is formed from electrically conductive materials. Further, the patch antenna element 320 can have any suitable shape. In one example, the patch antenna element 320 may be a rectangular patch antenna. In another example, the patch antenna element 320 may be a square patch antenna. In yet another example, the patch antenna element 320 may be microstrip antenna. In some examples, it may be more suitable for the patch antenna element 320 to have a square shape so that the patch antenna element 320 may serve as a symmetric driver that can be excited by direct probes or cross-slots to provide symmetric dual linear polarization performance. To that end, the patch antenna element 320 may be coupled to a feeding element 330 that electrically connects the patch antenna element 320 to a feeding port extending from the ground layer 340. The feeding element 330 may be associated with one of a H-polarization or a V-polarization. The antenna structure 300 may have another feeding element similar to the feeding element 330, where the other feeding element may be associated with the other one of the H-polarization or the V-polarization as will be discussed more fully below with reference to FIGS. 7A and 7B.

An RF signal fed via the feeding element 330 may excite or cause the patch antenna element 320 (driver) to emanate electromagnetic field. While the patch antenna element 320 is not electrically coupled to the folded magnetoelectric antenna element 301, the electromagnetic field emanated from the driver patch antenna element 320 may cause the magnetoelectric antenna element 301 to be parasitically excited (to emanate electromagnetic field). In some instances, the impedance bandwidth of the antenna structure 300 may be dependent on the separation between the patch antenna element 320 and the magnetoelectric antenna patches 310. In some instances, the folded magnetoelectric antenna element 301 may be referred to as a top patch and the patch antenna element 320 may be referred to as a bottom patch.

Referring to FIG. 3B, the perspective view of the antenna structure 300 shows only half of the folded magnetoelectric antenna element 301 (including the first magnetoelectric antenna patch 310-1 and the second magnetoelectric antenna patch 310-2) in order to provide a better view of the internal structure of the antenna structure 300. Similar to FIG. 3A, for simplicity, only portions of the first magnetoelectric antenna patch 310-1 are labeled in FIG. 3B and described below. However, analogous descriptions may be applied to other magnetoelectric antenna patches 310 (e.g., the second magnetoelectric antenna patch 310-2) of the folded magnetoelectric antenna element 301. In the illustrated example of FIG. 3B, the first fold portion 312-2 of the first magnetoelectric antenna patch 310-1 is shown as a via (of electrically conductive material) connecting the first portion 312-1 to the second fold portion 312-3. However, in other examples, the first fold portion 312-2 may be formed using edge plating (e.g., a copper plating that runs from the first layer 302 to the second layer 304 along a side of the antenna structure 300).

As further shown in FIG. 3B, a second outer edge or outer extent 315 of the first magnetoelectric antenna patch 310-1 may also be folded to form a fold portion (e.g., similar to the fold portion 312-2) shown by 312-7 that is contiguous to the first portion 312-1 and extending to the second layer 304 and another fold portion (e.g., similar to the second fold portion 312-3) disposed on the second layer 304.

As further shown in FIG. 3B, the antenna structure 300 may include vias 350 connecting the magnetoelectric antenna patches 310 to the ground layer 340. More specifically, each magnetoelectric antenna patch 310 may be shorted to the ground layer 340 by a via 350 located near the inner edge of the respective magnetoelectric antenna patch 310. The patch antenna element 320 may include openings or through holes 322 so that the vias 350 may extend from the first layer 302 (where the patches 310 are disposed) to the ground layer 340. In some examples, each via 350 may include two or more staggered vias as will be discussed more fully below with reference to FIGS. 5C-5F. As can be seen in FIG. 3B, the folds of the magnetoelectric antenna element 301 at the outer extent (e.g., the outer extent 315) are separate from the vias 350 that electrically connects the magnetoelectric antenna element 301 to ground to provide the magnetic dipoles.

Figure 4A:
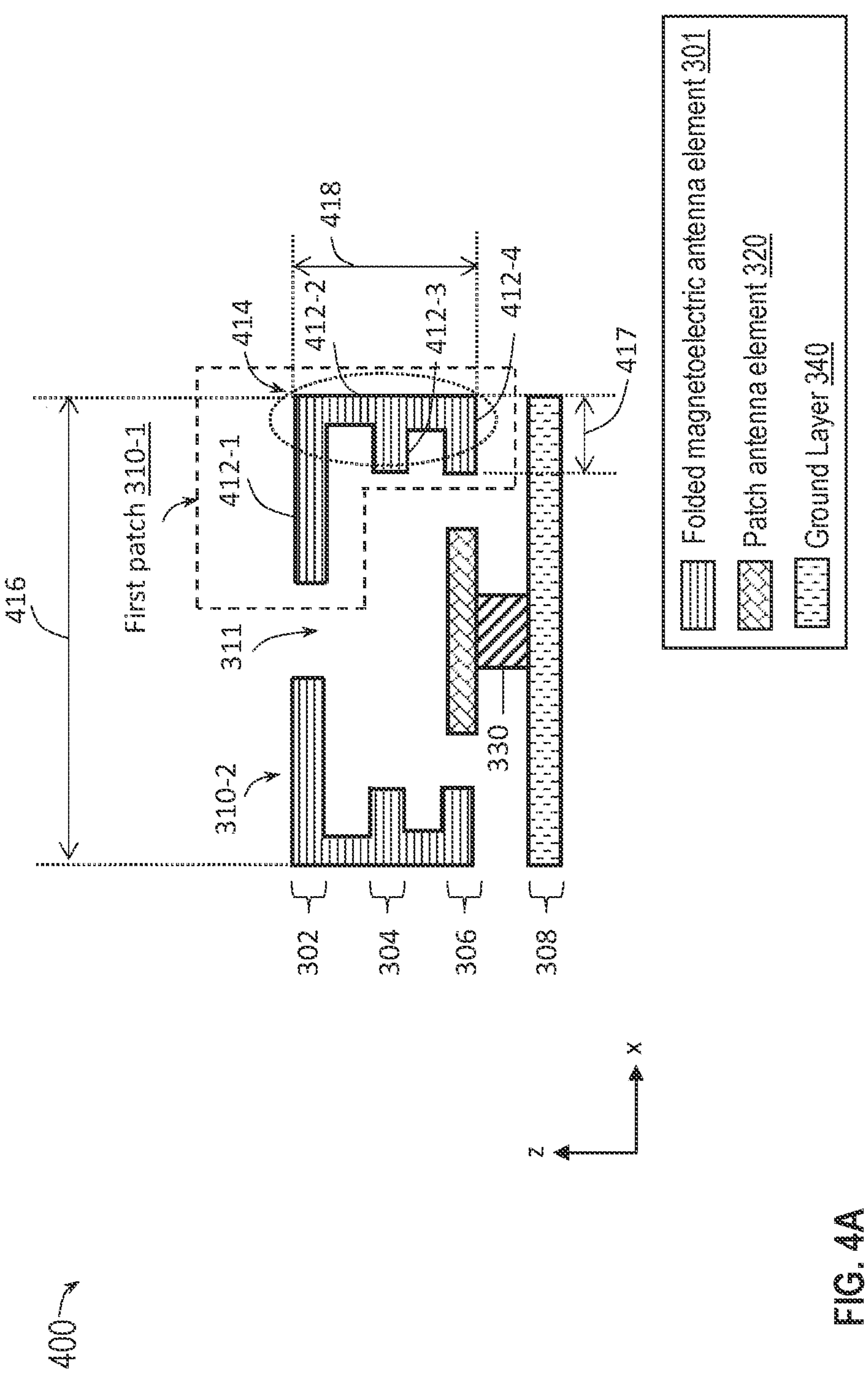
FIG. 4A is a cross-sectional view of an exemplary compact, wideband antenna structure, according to some embodiments of the present disclosure.
Figure 4B:
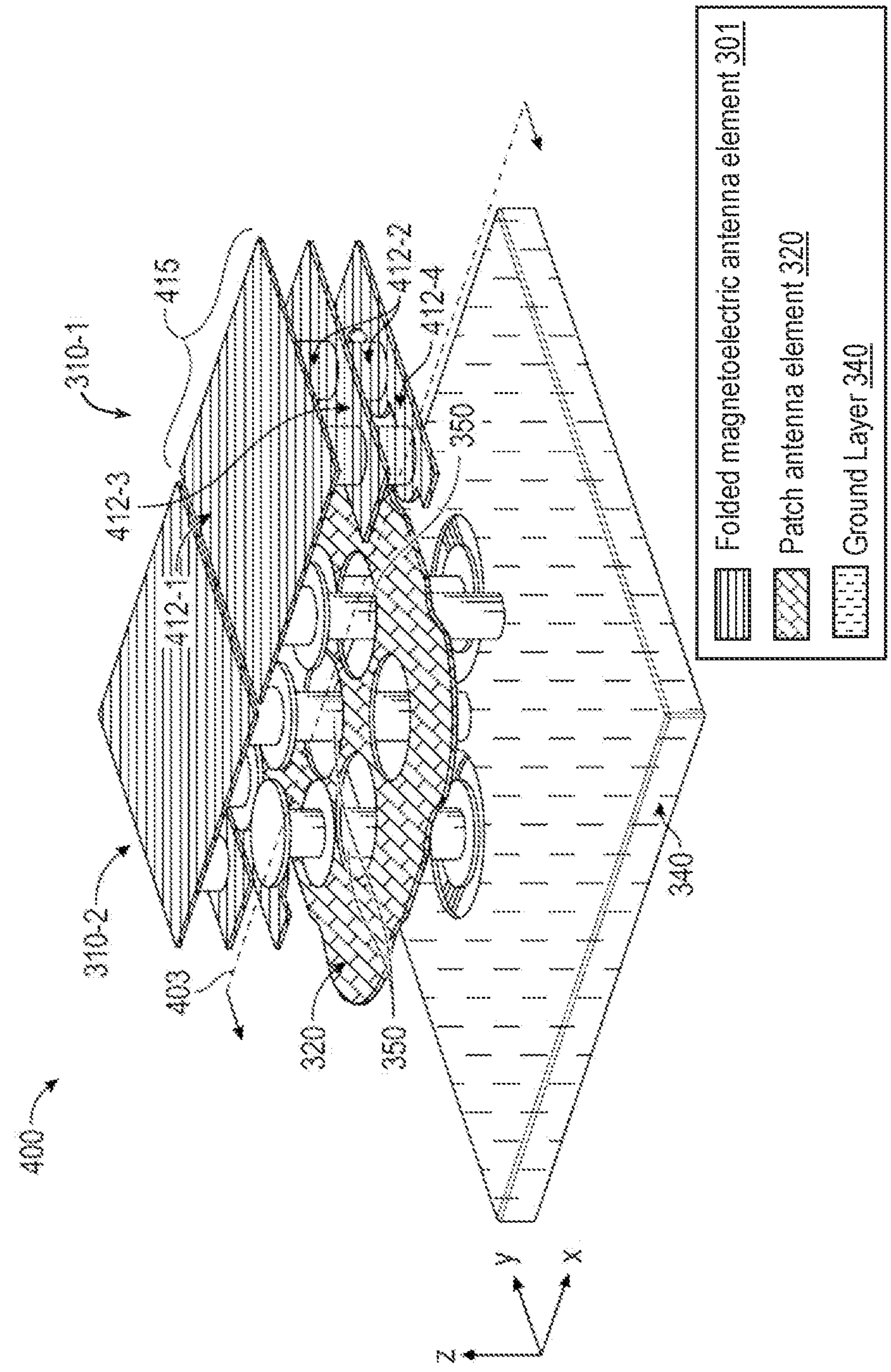
FIG. 4B is a perspective view of an exemplary compact, wideband antenna structure, according to some embodiments of the present disclosure.

FIGS. 4A and 4B are discussed in relation to each other to illustrate an exemplary wideband antenna structure 400 with a compact footprint that can fit into an antenna array (e.g., similar to the antenna array arrangements 100 and/or 200) to provide a wide scan angle. Similar to FIGS. 3A-3B, only portions of the first magnetoelectric antenna patch 310-1 are labeled in FIGS. 4A and 4B and described below. However, analogous descriptions may be applied to other patches 310 (e.g., the second magnetoelectric antenna patch 310-2) of the folded magnetoelectric antenna element 301.

FIG. 4A is a cross-sectional view of the compact, wideband antenna structure 400, according to some embodiments of the present disclosure. FIG. 4B is a perspective view of the compact, wideband antenna structure 400, according to some embodiments of the present disclosure. The antenna structure 400 may be suitable for use in an RF system for wireless transmission and/or reception. In some examples, the antenna structure 400 may be part of a phased antenna array (e.g., the antenna array arrangements 100 and/or 200), which may be used in conjunction with phase shifters to provide beam steering (e.g., as shown in the antenna apparatus 800 of FIG. 8). The cross-sectional view of FIG. 4A may be taken along the line 403 of FIG. 4B. The antenna structure 400 shares many elements with the antenna structure 300 of FIGS. 3A-3B; for brevity, a discussion of these elements is not repeated, and these elements may take the form of any of the embodiments disclosed herein.

As shown in FIG. 4A, the antenna structure 400 may be substantially similar to the antenna structure 300. However, the antenna structure 400 can provide a more compact footprint than the antenna structure 300. To that end, a larger portion or extent 414 of the magnetoelectric antenna element 301 may be folded compared to the folding at the antenna structure antenna structure 300. More specifically, the first magnetoelectric antenna patch 310-1 may include a first portion 412-1 (similar to the portion 312-1) disposed on the first layer 302, a first fold portion 412-2 (similar to the portion 312-2) contiguous to the first portion 412-1, and a second fold portion 412-3 (similar to the portion 312-3) contiguous to the first portion 412-1 and disposed on the second layer 304. However, the first fold portion 412-2 may extend vertically (e.g., along a direction of the z-axis) further to the third layer. As such, the first fold portion 412-1 of the magnetoelectric antenna element 301 in the antenna structure 400 may have a length 418 longer than the length 318 of FIG. 3. Hence, the magnetoelectric antenna element 301 in the antenna structure 400 may have a side dimension 416 shorter than the side dimension 316 of the magnetoelectric antenna element 301 in the antenna structure 300. Further, the first magnetoelectric antenna patch 310-1 may include a third fold portion 412-4 (another horizontal fold portion) contiguous to the first fold portion 412-2 and disposed (e.g., printed) on the third layer 306. The third fold portion 412-4 may be spaced apart from the patch antenna element 320 that is also disposed on the third layer 306. In some instances the third fold portion 412-4 may have the same length (e.g., the length 417, L3) as the second fold portion 412-3 as shown. In other instances, the third fold portion 412-4 may have a longer length or a shorter length than the second fold portion 412-3. The folding with the first fold portion 412-2, the second fold portion 412-3, and the third fold portion 412-4 may be referred to as 3X folding.

Similar to the antenna structure 300, the antenna length (or resonant length) (e.g., Lr) of the magnetoelectric antenna element 301 of the antenna structure 400 may include not only the side dimension 416 (e.g., L1) but also additional lengths from the fold portions of the magnetoelectric antenna patches 310-1 and 310-2. For instance, the vertical fold portion 412-2 of the first magnetoelectric antenna patch 310-1 has a length 418 (e.g., L2), each of the horizontal portions 412-3 and 412-4 of the first magnetoelectric antenna patch 310-1 has a length 417 (e.g., L3), and the second magnetoelectric antenna patch 310-2 has similar fold portions with similar lengths as the first magnetoelectric antenna patch 310-1. As such, the antenna length Lr for the antenna structure 400 may be L1+2×(L2+L3+L3).

Referring to FIG. 4B, the perspective view of the antenna structure 400 shows only half of the folded magnetoelectric antenna element 301 (including the first magnetoelectric antenna patch 310-1 and the second magnetoelectric antenna patch 310-2) in order to provide a better view of the internal structure of the antenna structure 400. Similar to FIG. 3B, the first fold portion 412-2 of the first magnetoelectric antenna patch 310-1 is shown as a via (of electrically conductive material) connecting the first portion 412-1 to the second fold portion 412-3. However, in other examples, the first fold portion 412-2 may be formed using edge plating (e.g., a copper plating that runs from the first layer 302 to the third layer 306 along a side of the antenna structure 300). Further, a second outer edge or outer extent 415 of the first magnetoelectric antenna patch 310-1 may be folded in a similar way to form portions similar to the fold portions 412-2, 412-3, 412-4.

FIGS. 5A-5F are discussed in relation to each other to illustrate an exemplary wideband antenna structure 500 with a compact footprint that can fit into an antenna array (e.g., similar to the antenna array arrangements 100 and/or 200) to provide a wide scan angle. Similar to FIGS. 3A-3B and 4A-3B, only portions of the first magnetoelectric antenna patch 310-1 are labeled in FIGS. 5A-5F and described below. However, analogous descriptions may be applied to other patches 310 (e.g., the second magnetoelectric antenna patch 310-2) of the folded magnetoelectric antenna element 301.

Figure 5A:
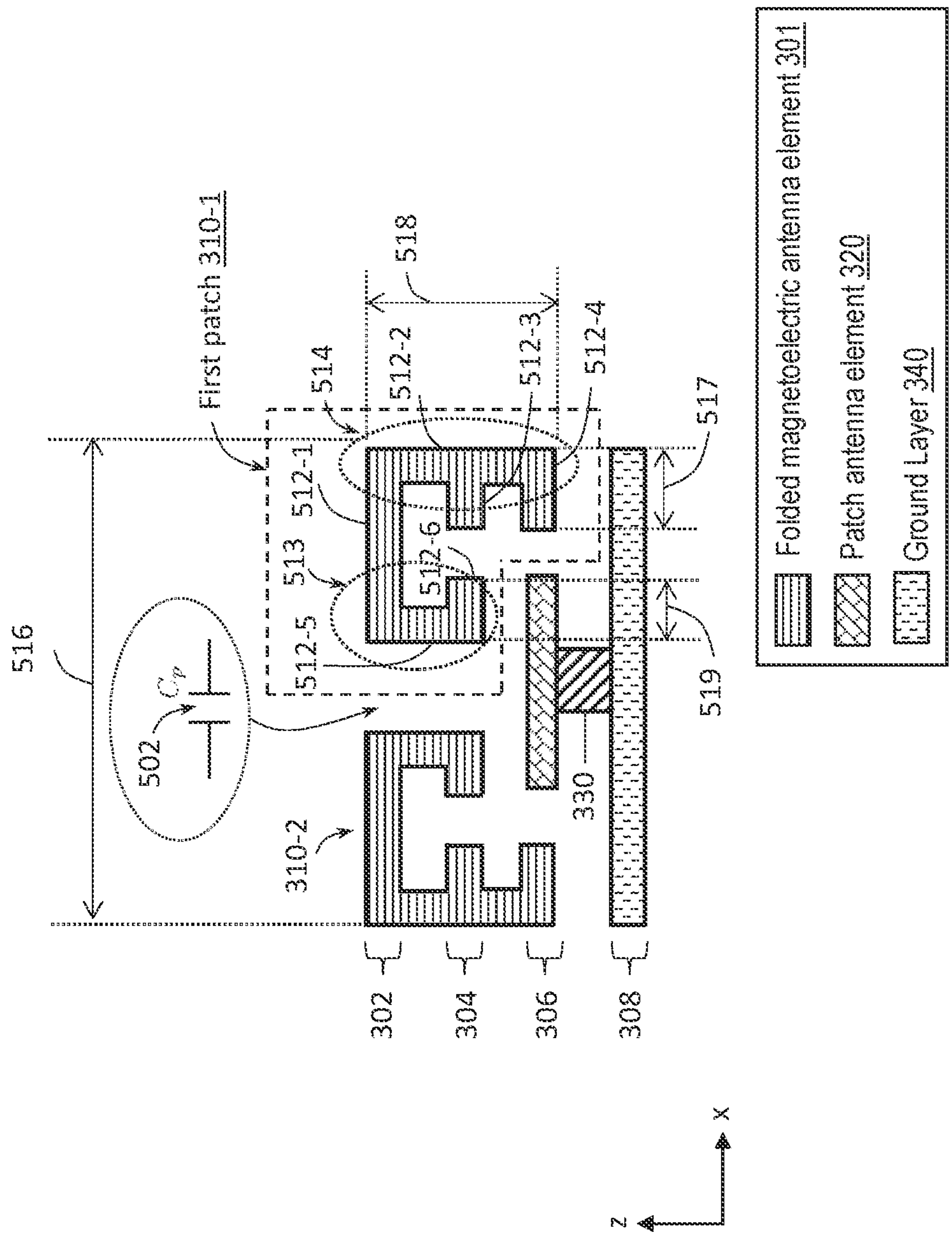
FIG. 5A is a cross-sectional view of an exemplary compact, wideband antenna structure, according to some embodiments of the present disclosure.
Figure 5B:
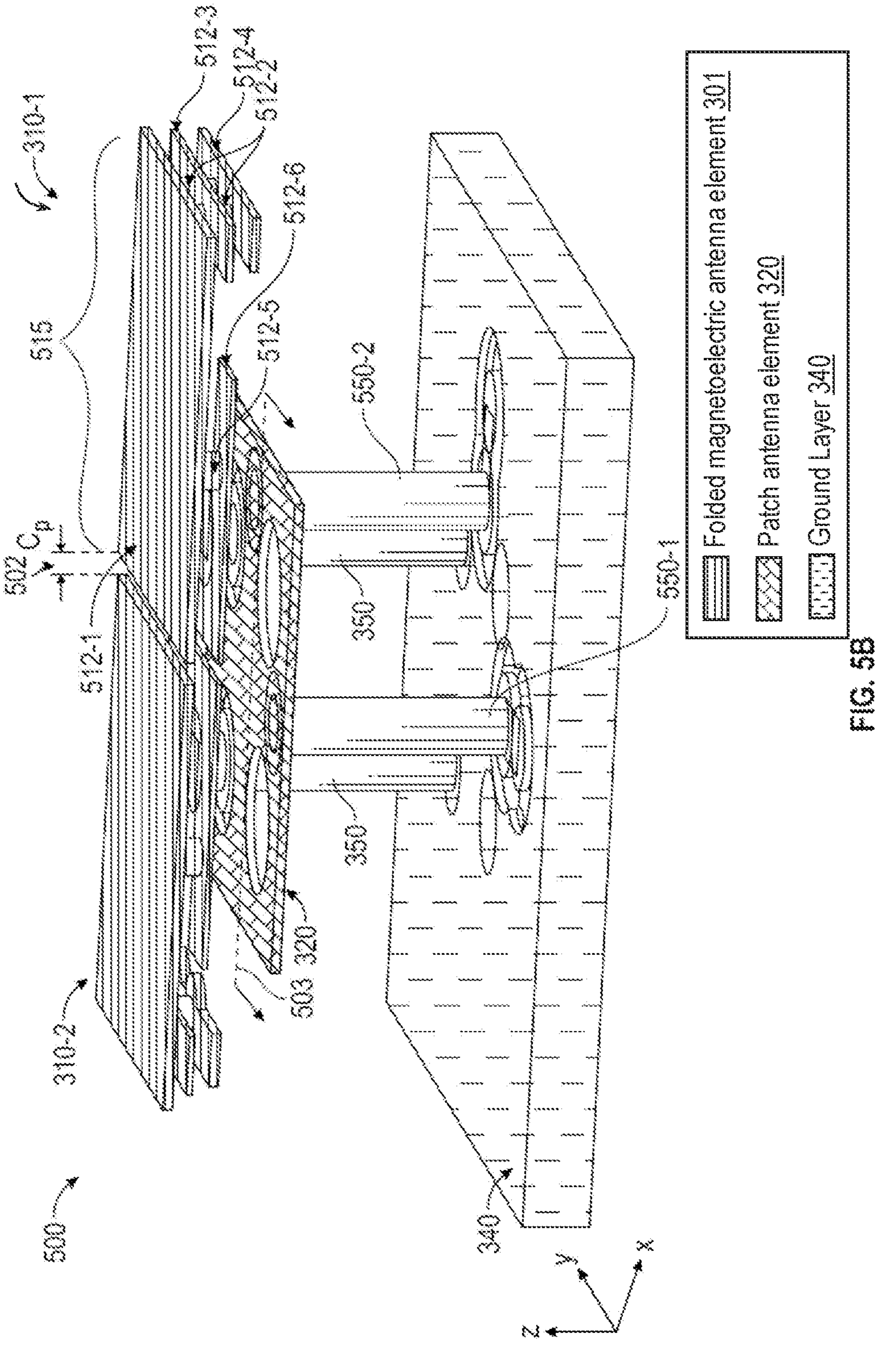
FIG. 5B is a perspective view of an exemplary compact, wideband antenna structure, according to some embodiments of the present disclosure.
Figure 5C:
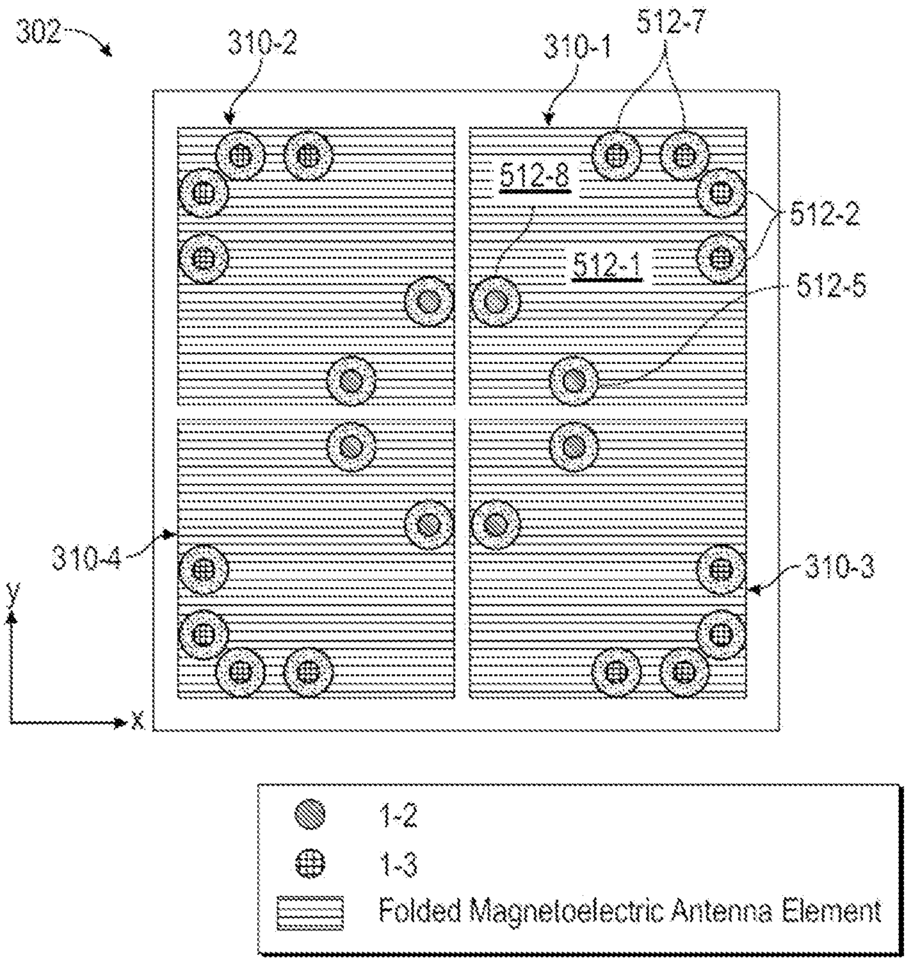
FIG. 5C is a top view of a first layer of an exemplary compact, wideband antenna structure, according to some embodiments of the present disclosure.

FIG. 5A is a cross-sectional view of the compact, wideband antenna structure 500, according to some embodiments of the present disclosure. FIG. 5B is a perspective view of the compact, wideband antenna structure 500, according to some embodiments of the present disclosure. The antenna structure 500 may be suitable for use in an RF system for wireless transmission and/or reception. In some examples, the antenna structure 500 may be part of a phased antenna array (e.g., the antenna array arrangements 100 and/or 200), which may be used in conjunction with phase shifters to provide beam steering (e.g., as shown in the antenna apparatus 800 of FIG. 8). The cross-sectional view of FIG. 5A may be taken along the line 503 of FIG. 5B. The antenna structure 500 shares many elements with the antenna structure 400 of FIGS. 4A-4B; for brevity, a discussion of these elements is not repeated, and these elements may take the form of any of the embodiments disclosed herein.

As shown in FIG. 5A, the antenna structure 500 may be substantially similar to the antenna structure 400. However, in the antenna structure 500, the magnetoelectric antenna element 301 is further folded at an inner edge or inner extent 513 of the magnetoelectric antenna element 301 in addition to the folding at an outer edge or outer extent 514 of the magnetoelectric antenna element 301. The additional folding at the inner extent 513 can reduce a side dimension of the antenna structure 500 further and/or lower a resonant frequency (e.g., represented by $f_0$) of the magnetoelectric antenna element 301. More specifically, the first magnetoelectric antenna patch 310-1 may include a first portion 512-1 (similar to the portions 312-1 and 412-1) disposed on the first layer 302, a first fold portion 512-2 (similar to the portions 312-2 and 412-2) contiguous to the first portion 512-1 and extending vertically to the third layer 306, a second fold portion 512-3 (similar to the portions 312-3 and 412-3) contiguous to the first portion 512-1 and disposed on the second layer 304, and a third fold portion 512-4 (similar to the portions 412-4) contiguous to the first portion 512-1 and disposed on the third layer 306. Further, the first magnetoelectric antenna patch 320-1 may include a fourth, vertical fold portion 512-5 (at an inner edge of the first magnetoelectric antenna patch 310-1) contiguous to the first portion 512-1 and extending vertically to the second layer 304 along a direction of the z-axis, and a fifth, horizontal fold portion 512-6 contiguous to the fourth fold portion 512-5 and disposed (e.g., printed) on the second layer 304. The fifth, horizontal fold portion 512-6 may have any suitable length 519. For instance, the fifth, horizontal fold portion 512-6 can have the same length, a longer length, or a shorter length compared to the second fold portion 512-3 and/or the third portion 512-4. In a similar way, the second magnetoelectric antenna patch 310-2 may be further folded at an inner edge in addition to the folding at an outer edge.

A parasitic capacitance 502 represented by Cp may be formed between the spaced apart magnetoelectric patches 310-1 and 310-2. In antennas, the larger the capacitance, the lower the resonant frequency. Typically, the surface area of an antenna may be enlarged to increase the capacitance of the antenna. Here, in the antenna structure 500, the increase in capacitance surface area is provided by the fourth fold portion 512-5 of the first magnetoelectric antenna patch 320-1 and a similar fold portion of the second patch 320-2. That is, the equivalent parasitic capacitance 502 between the magnetoelectric patches 310-1 and 310-2 may be increased through the inner edge folding. Accordingly, the antenna structure 500 may lower the resonant frequency without increasing a dimension of the antenna structure 500 and/or reducing the spacing between the inner extents of the magnetoelectric patches 310-1 and 310-2. In some instances, the parasitic capacitance 502 formed from the inner edge folding may be referred to as a folded inner or middle capacitance.

Similar to the antenna structures 300 and 400, the antenna length (or resonant length) (e.g., Lr) of the magnetoelectric antenna element 301 of the antenna structure 500 may include not only the side dimension 516 (e.g., L1) but also additional lengths from the fold portions of the magnetoelectric antenna patches 310-1 and 310-2. For instance, the vertical fold portion 512-2 of the first magnetoelectric antenna patch 310-1 has a length 518 (e.g., L2), each of the outer horizontal portions 512-3 and 512-4 of the first magnetoelectric antenna patch 310-1 has a length 517 (e.g., L3), the inner horizontal portion 516-6 of the first magnetoelectric antenna patch 310-1 has a length 519 (e.g., L4), and the second magnetoelectric antenna patch 310-2 has similar fold portions with similar lengths as the first magnetoelectric antenna patch 310-1. As such, the antenna length Lr for the antenna structure 500 may be L1+2×(L2+L3+L3+L4).

Referring to FIG. 5B, the perspective view of the antenna structure 500 shows only half of the folded magnetoelectric antenna element 301 (including the first magnetoelectric antenna patch 310-1 and the second magnetoelectric antenna patch 310-2) in order to provide a better view of the internal structure of the antenna structure 500. Similar to FIGS. 3B and 4B, the first fold portion 512-2 of the first magnetoelectric antenna patch 310-1 is shown as a via (of electrically conductive material) connecting the first portion 512-1 to the second fold portion 512-3. Further, the fourth fold portion 512-5 (at the inner edge) of the first magnetoelectric antenna patch 310-1 is shown as a via connecting the first portion 512-1 to the fifth fold portion 512-6. However, in other examples, at least one of the first fold portion 512-2 may be formed using edge plating (e.g., a copper plating that runs from the first layer 302 to the third layer 306) or the fourth fold portion 512-5 may be formed using edge plating (e.g., a copper plating that runs from the first layer 302 to the second layer 304 of the multi-layered PCB). In a similar way, a second outer edge or outer extent 515 of the first magnetoelectric antenna patch 310-1 may be folded to form fold portions similar to the fold portions 512-2, 512-3, 512-4 and/or a second inner edge of the first magnetoelectric antenna patch 310-1 may be folded to form fold portions similar to the fold portions 512-5 and 512-6.

As further shown in FIG. 5B, the antenna structure 500 may include a first feeding element 550-1 and a second feeding element 550-2 to provide dual polarization excitation. The feeding element 550-1 may correspond to the feeding element 330 shown FIG. 5A. One of the feeding elements 550-1 or 550-2 may be used to feed a signal for transmission in an H-polarization, and the other one of the feeding elements 550-1 or 550-2 may be used to feed a signal for transmission in a V-polarization. The dual polarization feeding structure will be discussed more fully below with reference to FIGS. 5C-5F and 7-8.

Figure 5D:
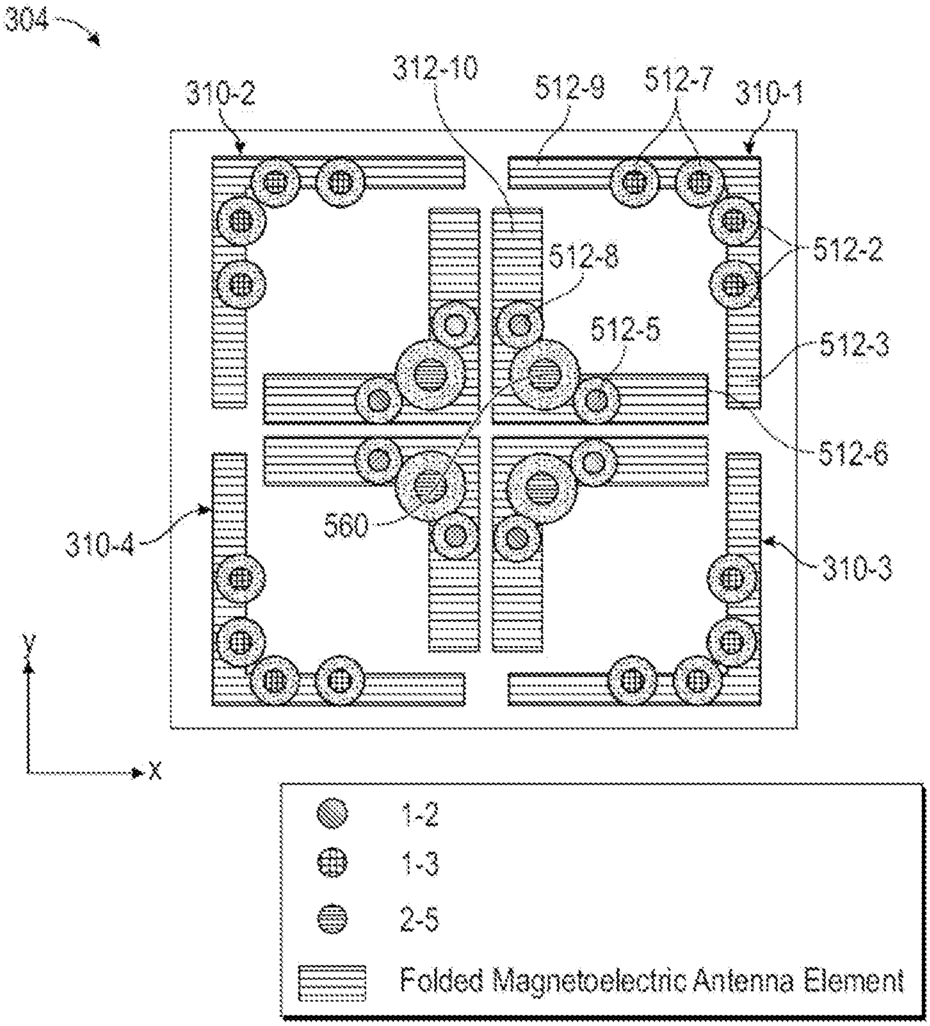
FIG. 5D is a top view of a second layer of an exemplary compact, wideband antenna structure, according to some embodiments of the present disclosure.
Figure 5E:
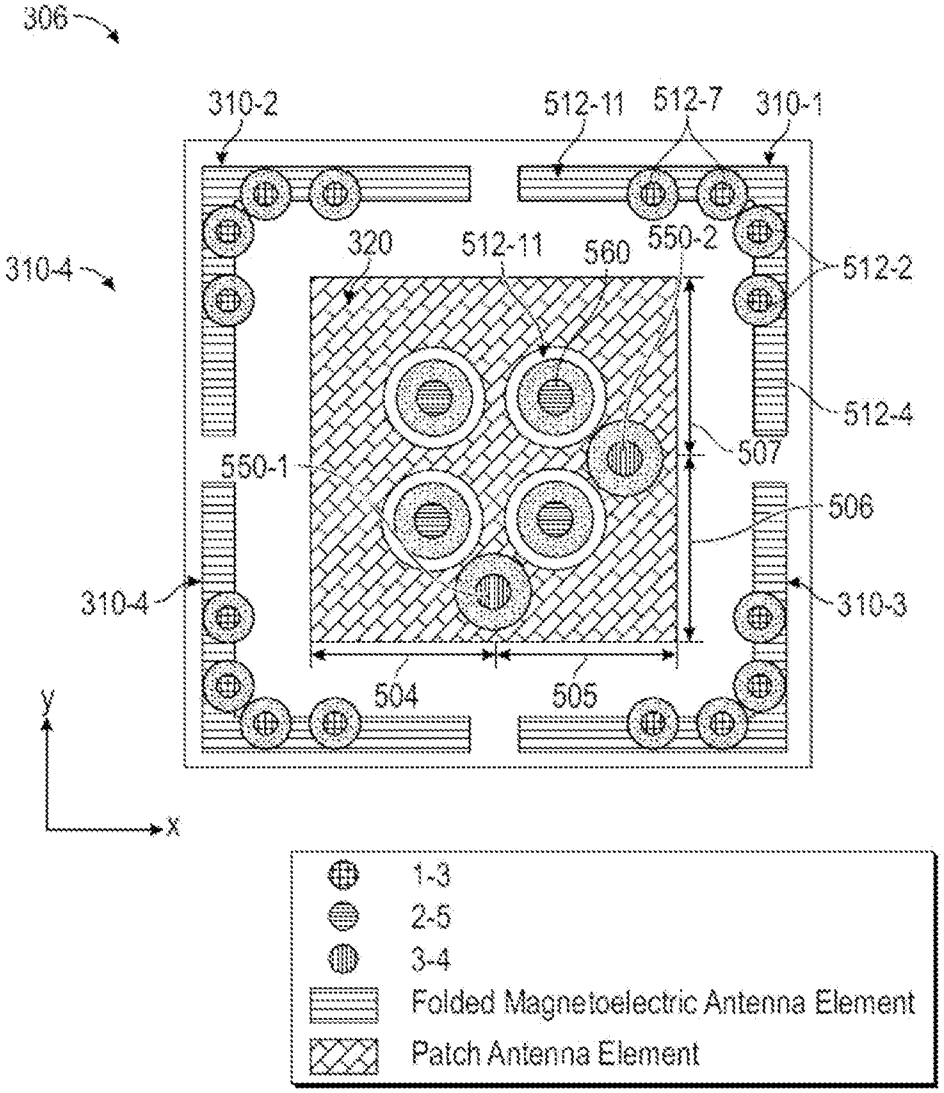
FIG. 5E is a top view of a third layer of an exemplary compact, wideband antenna structure, according to some embodiments of the present disclosure.
Figure 5F:
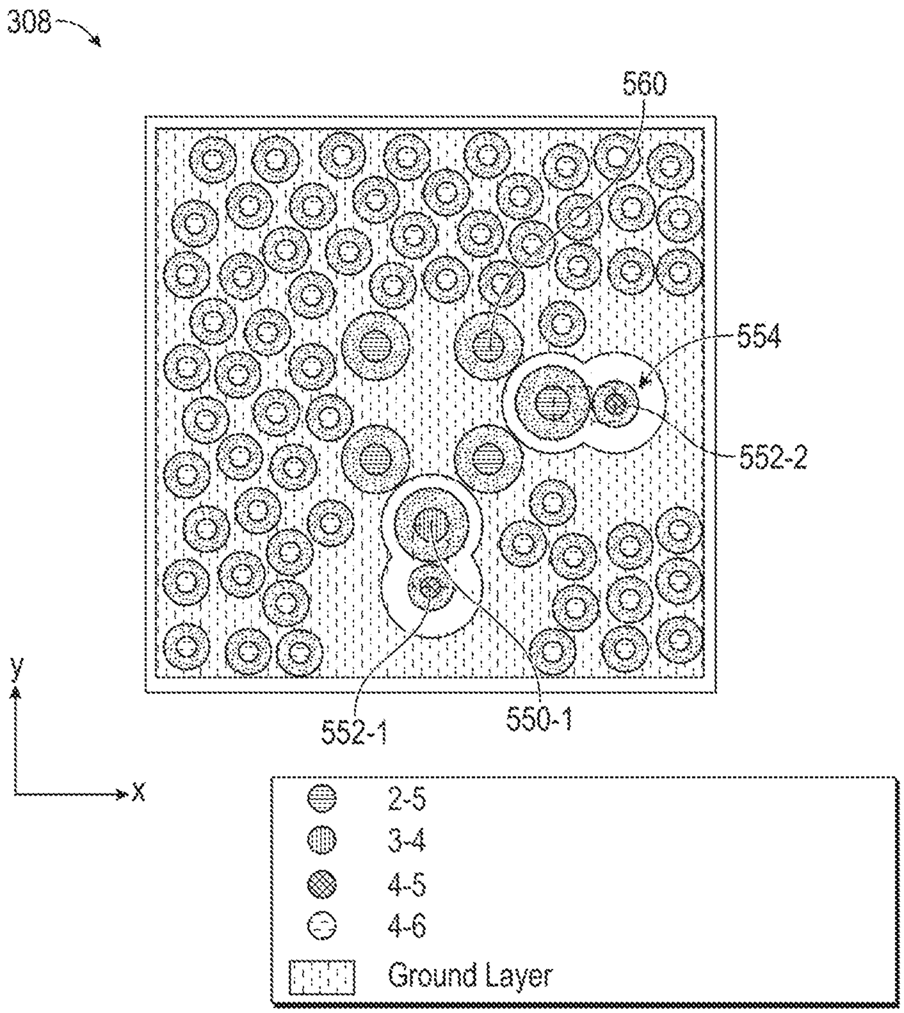
FIG. 5F is a top view of a fourth layer of an exemplary compact, wideband antenna structure, according to some embodiments of the present disclosure.

FIGS. 5C-5F provide a more detailed view of the arrangement of the folded magnetoelectric antenna element 301, the patch antenna element 320, the vias 350, and the feeding elements 550 in the antenna structure 500. FIG. 5C is a top view of the first layer 302 of the antenna structure 500, according to some embodiments of the present disclosure. As shown in FIG. 5A, each of the patches 310-1 FIG. 5D is a top view of the second layer 304 of the antenna structure 500, according to some embodiments of the present disclosure. FIG. 5E is a top view of the third layer 306 of the antenna structure 500, according to some embodiments of the present disclosure. FIG. 5F is a top view of the fourth layer 308 of the antenna structure 500, according to some embodiments of the present disclosure.

In some aspects, the antenna structure 500 may be arranged (e.g., printed) on a multi-layered PCB with six conductive layers, for example, including the first layer 302, the second layer 304, the third layer 306, and the fourth layer 308 as discussed above, and further include a fifth layer vertically below the fourth layer 308, and a sixth layer vertically below the fifth layer (e.g., as shown in the multi-layered PCB structure 600 of FIG. 6). In FIGS. 5C-5F, the circle symbols with the diagonal stripe pattern may represent vias connecting the first layer 302 to the second layer 304 (represented as 1-2), the circle symbols with the checkered pattern may represent vias connecting the first layer 302 to the third layer 306 (represented as 1-3), the circle symbols with the horizontal stripe pattern may represent vias connecting the second layer 304 to the fifth layer (another ground layer) of the antenna structure 500 (represented as 2-5), the circle symbols with the vertical stripe pattern may represent vias connecting the third layer 306 to the fourth layer 308 (represented as 3-4), the circle symbols with the crisscross pattern may represent vias connecting the fourth layer 308 to the fifth layer (represented as 4-5), and the circle symbols with the dashed-line pattern may represent vias connecting the fourth layer 308 to the sixth layer (represented as 4-6). In some instances, the sixth layer may be an LGA layer (e.g., the LGA layer 710 shown in FIGS. 7A and 7B). Further, the ring shape symbol with the dotted pattern may represent via pads, and the ring shape symbol with empty filled pattern may represent slots, through holes, or openings (i.e., a discontinuity in conductive material).

Referring to FIG. 5C, the folded magnetoelectric antenna element 301 includes 4 patches 310-1, 310-2, 310-3, and 310-4, each with a planar portion (e.g., the portion 512-1) disposed on a different quadrant of the first layer 302. The outer edges or outer extents of the first magnetoelectric antenna patch 310-1 are folded to form the vertical fold portions 512-2 and 512-7 extending from the first layer 302 to the third layer 306 along sides of the antenna structure 500. As explained above, the vertical fold portions 512-2 and 512-7 may be in the form of vias connecting the first layer 302 to the third layer 306 as shown by the circle symbols with the checkered pattern. The inner edges or inner extents of the first magnetoelectric antenna patch 310-1 are also folded to form vertical fold portions 512-5 and 512-8 extending from the first layer 302 to the second layer 304 internally along vertical planes within the structure 500.

Similarly, the vertical fold portions 512-5 and 512-8 may be in the form of vias connecting the first layer 302 to the second layer 304 as shown by the circle symbols with the diagonal stripe pattern. As can be seen in FIG. 5C, each of the other patches 310-2, 310-3, and 310-4 may have similar folds at corresponding outer edges and corresponding inner edges as the first magnetoelectric antenna patch 310-1.

Referring to FIG. 5D, the outer edges or outer extents of the first magnetoelectric antenna patch 310-1 are folded where the horizontal fold portions 512-3 and 512-9 (the folded magnetoelectric antenna arms) contiguous to corresponding vertical fold portions 512-2 and 512-7, respectively, are disposed on the second layer 304. The fold portions 512-3 and 512-9 at the outer extents may be contiguous with each other. Further, the inner edges or inner extents of the first magnetoelectric antenna patch 310-1 are folded where the horizontal fold portions 512-6 and 512-10 contiguous to corresponding vertical fold portions 512-5 and 512-8, respectively, are disposed on the second layer 304. The fold portions 512-6 and 512-10 may be contiguous with each other. As further shown, the horizontal fold portions 512-6 and 512-10 (formed from the folding at the inner extent of the first magnetoelectric antenna patch 310-1) are spaced apart from the horizontal fold portions 512-3 and 512-9 (formed from the folding at the outer extent of the first magnetoelectric antenna patch 310-1). Additionally, each of the other patches 310-2, 310-3, and 310-4 may have similar folds at corresponding outer edges and corresponding inner edges. Further, the horizonal fold portions (e.g., the portions 512-6 and 512-10) of each of the patches 310-1, 310-2, 310-3, and 310-4 formed from the folding at corresponding inner extents that are disposed on the second layer 304 are spaced apart from each other. As explained above, the folding at the inner extents of each of the patches 310-1, 310-2, 310-3, and 310-4 may increase the parasitic capacitance of the magnetoelectric antenna element 301, thereby lowering the resonant frequency of the magnetoelectric antenna element 301.

As further shown in FIG. 5D, the antenna structure 500 may include vias 560 (shown by the circle symbols with the horizontal stripe pattern) extending from the second layer 304 to the fifth layer (e.g., a ground layer). As mentioned above, each magnetoelectric antenna patch 310-1, 310-2, 310-3, 310-4 may be shorted to ground by staggered vias (e.g., including two or more interconnected vias connecting a corresponding magnetoelectric antenna patch 310-1, 310-2, 310-3, 310-4 to a ground layer). In the illustrated example, the first magnetoelectric antenna patch 310-1 is shorted to the ground layer (the fifth layer) by two staggered vias, the via or portion 512-5 connecting the first layer 302 to the second layer 304 and the via 560 connecting the second layer 304 to the fifth layer. For example, each via 350 shown in FIGS. 3B, 4B, and 5B may be formed by two staggered vias similar to the vias 512-5 and 560. The use of staggered vias may lengthen the path to ground, and thus may lower the resonant frequency and may work well in conjunction with the increased capacitance 502 (from the inner folds of the patches 310). As can be seen in FIG. 5D, each of the other patches 310-2, 310-3, and 310-4 may be shorted to the ground layer in a similar manner as the first magnetoelectric antenna patch 310-1. In general, each magnetoelectric antenna patch 310-1, 310-2, 310-3, 310-4 may be shorted to ground by any suitable number of staggered vias (e.g., 3 or more) and in any suitable staggered configuration (e.g., a first via from the first layer 302 to the third layer 306 and a second via from the third layer 306 to the fifth layer).

Referring to FIG. 5E, the outer edges or outer extents of the first magnetoelectric antenna patch 310-1 are folded where horizontal fold portions 512-4 and 512-11 contiguous to corresponding vertical fold portions 512-2 and 512-7, respectively, are disposed on the third layer 306. As further shown in FIG. 5E, the patch antenna element 320 is disposed at about a central portion of the third layer 306 and spaced apart from the horizontal fold portions 512-4 and 512-11 that are disposed on the same third layer 306. Further, the patch antenna element 320 may include through holes 322 (the empty filled outer ring) to allow the vias 560 to extend from the second layer 304 to the fifth layer.

As further shown in FIG. 5E, the patch antenna element 320 may be electrically connected to the feeding elements 550-1 and 550-2 (e.g., in the form of vias shown by the circle symbols with the vertical stripe pattern extending from the third layer 306 to the fourth layer 308). As mentioned above, the patch antenna element 320 may serve as a symmetric driver that can be excited by direct probes or cross-slots to provide symmetric dual linear polarization performance. To provide symmetric dual linear polarization performance (e.g., about the same radiation pattern for H-polarization and V-polarization), the feeding elements 550-1 and 550-2 can be located symmetrically in the antenna structure 500. Symmetric dual linear polarization performance may be refer to the performance. For example, the feeding element 510-1 may be located at a distance 504 away from one side of the patch antenna element 320 and at a distance 505 away from another side of the patch antenna element 320, and the feeding element 510-2 may be located at a distance 506 away from one side of the patch antenna element 320 and at a distance 507 away from another side of the patch antenna element 320, where the distances 504, 505, 506, and 507 are about the same. In this way, the antenna structure 500 may provide about the same performance for the H-polarization and the V-polarization irrespective of any rotation of the antenna structure 500 that may occur during assembly.

Referring to FIG. 5F, the vias 560 extend from the second layer 304 to the fifth layer through the fourth layer 308. Additionally, the feeding elements 550-1 and 550-2 (in the form of vias shown by the circle symbols with the vertical stripe pattern) extend from the third layer 306 to the fourth layer 308. The feeding elements 550-1 and 550-2 are further connected to the fifth layer by vias 552-1 and 552-2 shown by the circle symbols with the crisscross pattern. The fourth layer 308 may further include through holes 554 (openings) at which the feeding element 550-2 connects to the via 552-2 and at which the feeding element 550-2 connects to the via 552-2. Further, the fourth layer 308 can be connected to the sixth layer (e.g., the LGA layer of FIGS. 7 and 8) by vias shown by the circle symbols with the dashed-line pattern.

While FIGS. 5C-5F are described with respect to the antenna structure 500, the antenna structures 300 and 400 may have substantially similar top views as shown in FIGS. 5C-5F but some of the fold portions may not be present or may be shorter. For example, the antenna structures 300 and 400 may not have the fold portions 512-5, 512-6, 512-8, 512-10 at the inner extents of the patches 310-1, 310-2, 310-3, and 310-4. Further, the magnetoelectric antenna element 301 in the antenna structure 300 may include shorter vertical fold portions (e.g., extending from the first layer 302 to the second layer 304 and not the third layer 306) at the outer extents of the patches 310-1, 310-2, 310-3, and 310-4, and thus may not have the horizontal fold portions (e.g., the fold portions 512-4 and 512-11) on the third layer 306.

Figure 6:
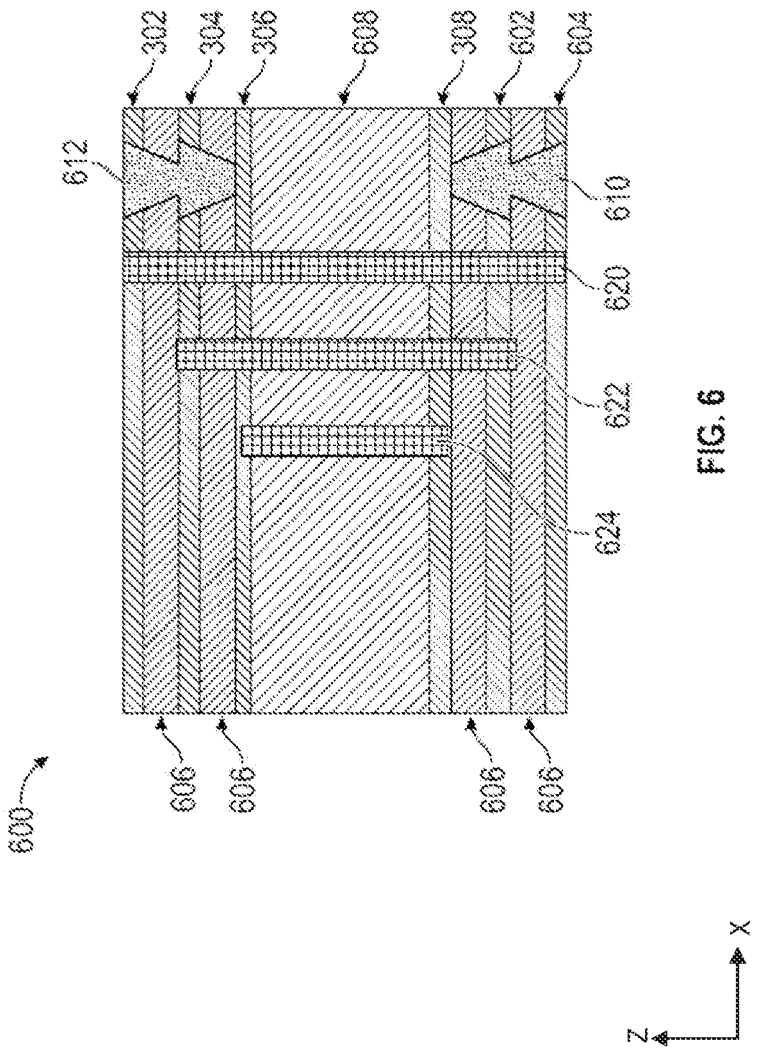
FIG. 6 is a cross-sectional view of an exemplary multi-layered PCB antenna structure, according to some embodiments of the present disclosure.

FIG. 6 is a cross-sectional view of an exemplary multi-layered PCB structure 600, according to some embodiments of the present disclosure. In some aspects, the multi-layered PCB structure 600 may be part of the antenna structure 300 of FIGS. 3A-3B, part of the antenna structure 400 of FIGS. 4A-4B, or part of the antenna structure 500 of FIGS. 5A-5F. For example, the PCB layers 302, 304, 306, and 308 discussed above are layers of the structure 600.

As shown in FIG. 6, the multi-layered PCB structure 600 may include a plurality of conductive layers 302, 304, 306, 308, 602, and 604, a plurality of insulating layers 606, and a PCB core 608. The conductive layers 302, 304, 306, 308, 602, and 604 may be made of any suitable conductive material (e.g., copper). The insulating layers 606 (e.g., prepreg) and the PCB core 608 may be made of dielectric materials. In some aspects, the dielectric material may have a dielectric constant between about 3 and about 4. In some aspects, the PCB core 608 may have a height (or thickness) between about 0.05 and about 0.2 of a free-space wavelength (to have the antenna functional). The top three layers 302, 304, and 306 may be signal layers in which the folded magnetoelectric antenna element 301 and the patch antenna element 320 are formed as discussed above with reference to FIGS. 3A-3B, 4A-4B, and 5A-5F. The bottom three layers 308, 602, and 604 may be ground layers. In some aspects, the last bottom layer 604 may be an LGA layer as will be discussed more fully below with reference to FIGS. 7A-7B. In some aspects, the dielectric antenna height (e.g., including the PCB core 608 and all the dielectric or insulating layers 606) of the multi-layered PCB 600 may be between about 0.075 and 0.1 of the resonant wavelength.

As further shown in FIG. 6, the multi-layered PCB structure 600 may include vias (electrical connections) to connect one layer to another layer. For example, a via 612 may connect the first layer 302 to the third layer 306, a via 610 may connect the fourth layer 308 to the sixth layer 604, a via 620 may connect the first layer 302 to the sixth layer 604, a via 622 may connect the second layer 304 to the fifth layer 602, and a via 624 may connect the third layer 306 to the fourth layer 602. In general, the multi-layered PCB structure 600 may include any suitable number of vias arranged in any suitable configuration. In some aspects, the vias 610 and 612 may be laser vias (e.g., when the vias do not extend across a thick extent of the structure 600), and the vias 620, 622, and 624 may be mechanical vias (e.g., when the vias extend across a thick extent of the structure 600). In some aspects, the mechanical via 622 may correspond to the via 560 (the ground shorting via) discussed above with reference to FIGS. 5D to 5F, and the mechanical via 624 may correspond to one of the vias or feeding elements 550. In some aspects, the laser via 612 may correspond to the vertical fold portions 312-3, 412-3, 512-3, 512-5 of the magnetoelectric antenna element 301 discussed above with reference to FIGS. 3A-3B, 4A-4B, and 5A-5F, respectively.

As further shown in FIG. 6, the multi-layered PCB structure 600 includes a symmetric stack up where the same number of conductive layers are above and below the PCB core 608. More specifically, the multi-layered PCB structures 600 includes three conductive layers 302, 304, and 306 on top of the PCB core 608 and the three conductive layers 308, 602, and 604 below the PCB core 608. The symmetric stackup can avoid mechanical warpage during manufacturing of the multi-layered PCB structure 600. In general, the multi-layered PCB structure 600 can include any suitable number of conductive layers (e.g., 4, 5, 7, 8, 9, 10, 11, 12 or more) and any stackup configuration.

Figure 7A:
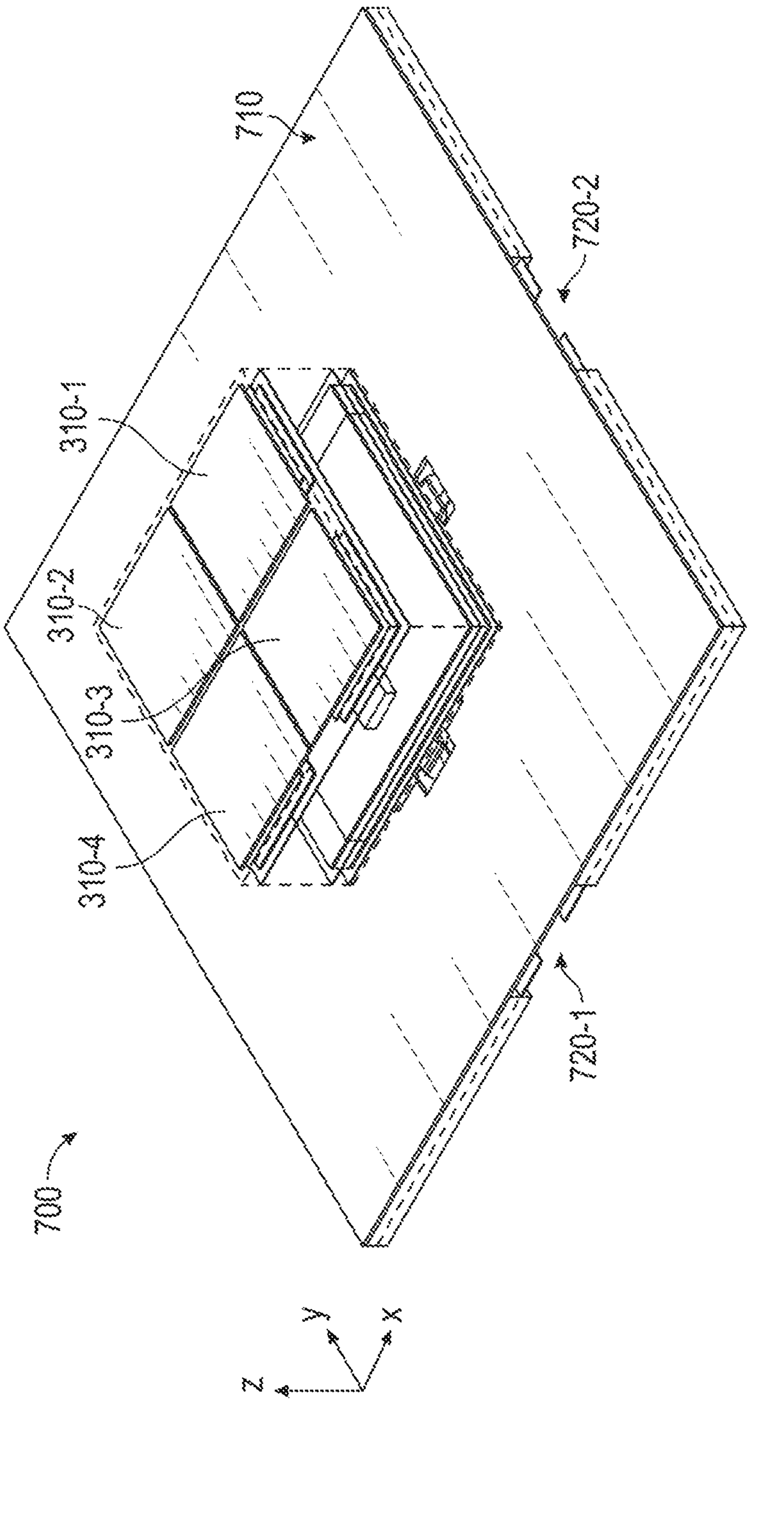
FIG. 7A is a perspective view of an exemplary compact, wideband antenna structure with a land grid array (LGA) interface, according to some embodiments of the present disclosure.
Figure 7B:
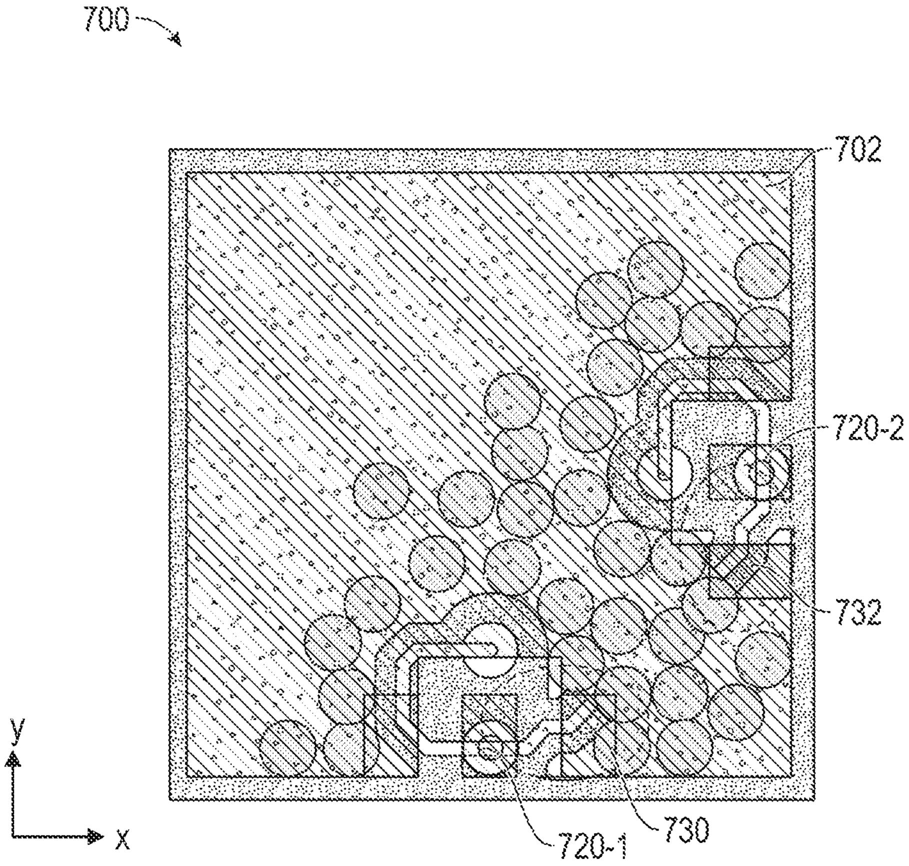
FIG. 7B is a top view of an exemplary compact, wideband antenna structure with am LGA, according to some embodiments of the present disclosure.

FIGS. 7A and 7B are discussed in relation to each other to illustrate the interface between an SMT antenna element and an LGA. FIG. 7A is a perspective view of an exemplary compact, wideband antenna structure 700 with an LGA interface, according to some embodiments of the present disclosure.

The antenna structure 700 is an SMT component with an interface to an LGA layer 710. The SMT component may be built from a multi-layered PCB similar to the multi-layered PCB structure 600 of FIG. 6. The antenna structure 700 may include a folded magnetoelectric antenna element 301 (including a plurality of patches 310-1, 310-2, 310-3, and 310-4) and a patch antenna element 320 (not shown) arranged (e.g., printed) on the multi-layered PCB as discussed above with reference to FIGS. 3A-3B, 4A-4B, or 5A-5C. For brevity, a discussion of these elements is not repeated, and these elements may take the form of any of the embodiments disclosed herein.

In some aspects, the LGA layer 710 may correspond to a sixth layer (e.g., the sixth layer 604) of the multi-layered PCB. The LGA layer 710 may include feeding ports 720-1 and 720-2, where one of the feeding port 720-1 or 720-2 may be used to feed a first RF signal (from an RF transceiver) for transmission in an H-polarization, and the other one of the feeding port 720-1 or 720-2 may be used to feed a second RF signal (from the RF transceiver) for transmission in a V-polarization. In some aspects, the first and second RF signals may carry different data streams, for example, to increase throughput. In other aspects, the first and second RF signals may carry the same data stream, for example, to increase diversity.

In some aspects, for SMT antennas (e.g., the antenna structure 700), the antennas can be designed for the impedance transformed by the package interface (e.g., the LGA layer 710 or any other package interface). In some instances, the package interface can be matched separately to a single impedance.

FIG. 7B is a top view of the compact, wideband antenna structure 700 with the LGA interface, according to some embodiments of the present disclosure. FIG. 7B illustrates a top view of a fifth layer 702 with the LGA layer 710 (a sixth layer) below the fifth layer 702 of the antenna structure 700. The fifth layer 702 may correspond to the fifth layer 602. As shown in FIG. 7B, the fifth layer 702 may include RF traces that form transmission lines 730 and 732, where end portions (shown by the dotted ovals) of the transmission lines 730 and 732 may form short circuit stubs that can interconnect the feeding ports 720-1 and 720-2 on the LGA layer 710 to other layers of the multi-layered PCB. In some aspects, the transmission line 732 may interconnect the feeding port 720-2 to feeding elements (e.g., the feeding elements 550-1 and 550-2) that are electrically coupled the patch antenna element (disposed on the third layer of the multi-layered PCB). Similarly, the transmission line 730 may interconnect the feeding port 720-1 to feeding elements that are electrically coupled the patch antenna element.

In some aspects, each of the antenna structures 300, 400, 500, and 700 discussed herein may have a small footprint (e.g., the side dimension 316, 416, and/or 516) between about 0.25 $\lambda_0$ and about 0.3 $\lambda_0$ and may support a wide operating bandwidth, for example, with a fractional bandwidth up to about 25%. The small footprint may enable the antenna structures 300, 400, and/or 500 to be arranged in an antenna array (e.g., the arrangements 100 and/or 200) with a small inter-element pitch (e.g., the pitch 104 and 204), and thereby capable of providing a wide scan range (e.g., with a scan angle of ±70 degrees in each of azimuth and elevation).

The small footprint may also be in terms of the height of the antenna structures 300, 400, 500, and 700 to allow for packaging into SMT components.

In some aspects, each of the antenna structures 300, 400, 500, and 700 discussed herein may support dual linear polarization with symmetric polarization performance. Further, each of the antenna structures 300, 400, 500, and 700 discussed herein may support dual bands (e.g., 5G dual bands where one band may have a center frequency of about 24 GHz and another band may have a center frequency of about at 29.5 GHZ). Thus, the antenna structures discussed herein can advantageously enable an RF system to utilize the same antenna structures or elements for operations in each of the dual bands rather than utilizing separate antenna structures or elements for different bands, thereby lowering cost and/or size of the RF system.

In general, the disclosed antenna structures (e.g., the antenna structures 300, 400, 500, and 700) may include stacked folded magnetoelectric antenna element (e.g., the magnetoelectric antenna element 301) and patch antenna element (e.g., the patch antenna element 320) printed on a multi-layered PCB (e.g., the multi-layered PCB structure 600), where the folded magnetoelectric antenna element can be folded at one or more outer extents (with 2X folding or 3X folding) and/or one or more inner extents. Each of the horizontal fold portions and vertical fold portions may have any suitable length. In some use case scenarios, the folded magnetoelectric antenna element can be folded at one or more outer extents, but not at the inner extents. In other use case scenarios, the folded magnetoelectric antenna element can be folded at one or more inner extents, but not at the outer extents. In yet other use case scenarios, the folded magnetoelectric antenna element can be folded at one or more outer extents and at one or more inner extents. Further, the disclosed antenna structures suitable for use with single polarization excitation or dual polarization excitation and can be used with probe excitation or slot excitation.

Example Antenna Apparatus

Figure 8:
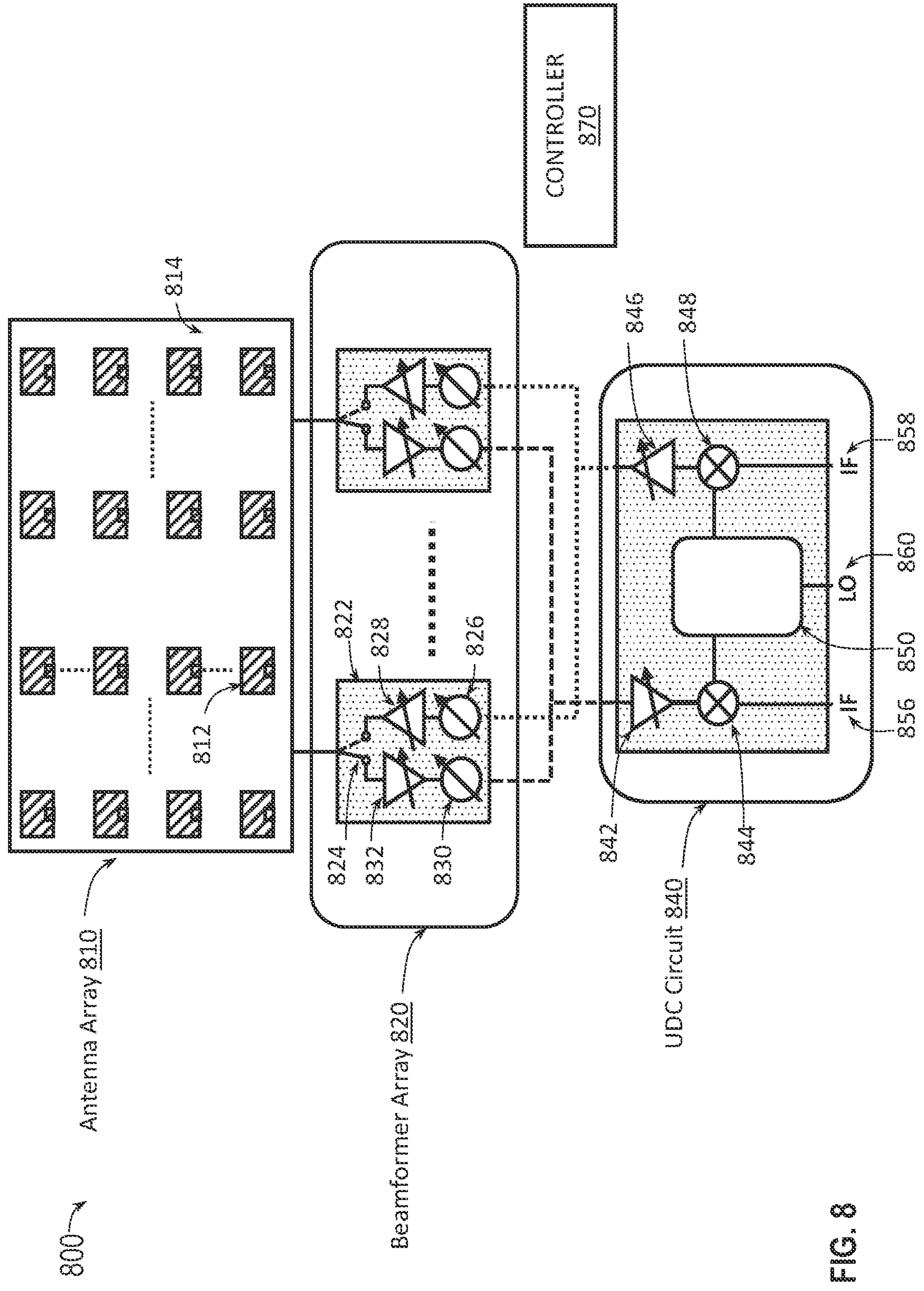
FIG. 8 is a schematic diagram of an exemplary antenna apparatus, according to embodiments of the present disclosure.

FIG. 8 is a schematic diagram of an exemplary antenna apparatus 800, e.g., a phased array system/apparatus, in which compact, wideband antenna elements are utilized to provide a wide scan range, according to some embodiments of the present disclosure. As shown in FIG. 8, the antenna apparatus 800 may include an antenna array 810, a beamformer array 820, a UDC circuit 840, and a controller 870.

In general, the antenna array 810 may include a plurality of antenna elements 812 (only one of which is labeled with a reference numeral in FIG. 8 in order to not clutter the drawing), housed in (e.g., in or over) a substrate 814, where the substrate 814 may be, e.g., a PCB or any other support structure. In various embodiments, the antenna elements 812 may be radiating elements or passive elements. For example, the antenna elements 812 may include dipoles, open-ended waveguides, slotted waveguides, microstrip antennas, and the like. In some embodiments, the antenna elements 812 may include any suitable elements configured to wirelessly transmit and/or receive RF signals. The antenna array 810 may be a phased array antenna and, therefore, will be referred to as such in the following. In some embodiments, the phased array antenna 810 may be a printed phased array antenna. In some embodiments, the antenna array 810 may be similar to the antenna array arrangements 100 or 200.

At least some of the antenna elements 812 may be implemented using a combination of folded magnetoelectric antenna element (e.g., the folded magnetoelectric antenna element 301) and patch antenna element (e.g., the patch antenna element 320) formed or printed on a multi-layered PCB (e.g., the multi-layered PCB structure 600) as discussed herein, and configured to have a wide operating bandwidth while extending the scan range of the phased array antenna 810 (e.g., with an azimuth scan angle and an elevation scan angle each up to about 70 degrees). Further details shown in FIG. 8, such as the particular arrangement of the beamformer array 820, of the UDC circuit 840, and the relation between the beamformer array 820 and the UDC circuit 840 may be different in different embodiments, with the description of FIG. 8 providing only some examples of how these components may be used together with the phased array antenna 810 including antenna elements 812 configured, for example, using the antenna structures 300, 400, 500, and/or 700. Furthermore, although some embodiments shown in the present drawings illustrate a certain number of components (e.g., a certain number of antenna elements 812, beamformers, and/or UDC circuits), it is appreciated that these embodiments may be implemented with any number of these components in accordance with the descriptions provided herein. Furthermore, although the disclosure may discuss certain embodiments with reference to certain types of components of an antenna apparatus (e.g., referring to a substrate that houses antenna element as a PCB although in general it may be any suitable support structure), it is understood that the embodiments disclosed herein may be implemented with different types of components.

The beamformer array 820 may include a plurality of, beamformers 822 (only one of which is labeled with a reference numeral in FIG. 8 in order to not clutter the drawing). The beamformers 822 may be seen as transceivers (e.g., devices which may transmit and/or receive signals, in this case-RF signals) that feed to antenna elements 812. In some embodiments, a single beamformer 822 may be associated with (i.e., exchange signals with, e.g., feed signals to) one of the antenna elements 812 (e.g., in a one-to-one correspondence). In other embodiments, multiple beamformers 822 may be associated with a single antenna element 812. Yet in other embodiments, a single beamformer 822 may be associated with a plurality of antenna elements 812. In some embodiments, when a given antenna element 812 is implemented with the antenna structure 300, 400, 500, or 700 as discussed herein (e.g., with stacked folded magnetoelectric antenna element and patch antenna element printed on a multi-layered PCB), a dual polarized beamformer 822 may be configured to support signals for dual polarization. In general, one or more beamformers 822 may be connected to each antenna element 812 to support beamforming for signals with dual polarization.

In some embodiments, each of the beamformers 822 may include a switch 824 to switch the path from the corresponding antenna element 812 to the receiver or the transmitter path. Although not specifically shown in FIG. 8, in some embodiments, each of the beamformers 822 may also include another switch to switch the path from a signal processor (also not shown) to the receiver or the transmitter path. As shown in FIG. 8, in some embodiments, the transmit path (TX path) of each of the beamformers 822 may include a phase shifter 826 and a variable (e.g., programmable) gain amplifier 828, while the receive path (RX path) may include a phase shifter 830 and a variable (e.g., programmable) gain amplifier 832. The phase shifter 826 may be configured to adjust the phase of the RF signal to be transmitted (TX signal) by the antenna element 812 and the variable gain amplifier 828 may be configured to adjust the amplitude of the TX signal to be transmitted by the antenna element 812. Similarly, the phase shifter 830 and the variable gain amplifier 832 may be configured to adjust the RF signal received (RX signal) by the antenna element 812 before providing the RX signal to further circuitry, e.g., to the UDC circuit 840, to the signal processor (not shown), etc. The beamformers 822 may be considered to be "in the RF path" of the antenna apparatus 800 because the signals traversing the beamformers 822 are RF signals (i.e., TX signals which may traverse the beamformers 822 are RF signals upconverted by the UDC circuit 840 from lower frequency signals, e.g., from intermediate frequency (IF) signals or from baseband signals, while RX signals which may traverse the beamformers 822 are RF signals which have not yet been downconverted by the UDC circuit 840 to lower frequency signals, e.g., to IF signals or to baseband signals).

Although a switch is shown in FIG. 8 to switch from the transmitter path to the receive path (i.e., the switch 824), in other embodiments of the beamformer 822, other components can be used, such as a duplexer. Furthermore, although FIG. 8 illustrates an embodiment where the beamformers 822 include the phase shifters 826, 830 (which may also be referred to as "phase adjusters") and the variable gain amplifiers 828, 832, in other embodiments, any of the beamformers 822 may include other components to adjust the magnitude and/or the phase of the TX and/or RX signals. In some embodiments, one or more of the beamformers 822 may not include the phase shifter 826 and/or the phase shifter 830 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 822.

Turning to the details of the UDC, in general, the UDC circuit 840 may include an upconverter and/or downconverter circuitry, i.e., in various embodiments, the UDC circuit 840 may include 8) an upconverter circuit but no downconverter circuit, 2) a downconverter circuit but no upconverter circuit, or 3) both an upconverter circuit and a downconverter circuit. As shown in FIG. 8, in some embodiments, the downconverter circuit of the UDC circuit 840 may include an amplifier 842 and a mixer 844, while the upconverter circuit of the UDC circuit 840 may include an amplifier 846 and a mixer 848. In some embodiments, the UDC circuit 840 may further include a phase shift module 850.

In various embodiments, the term "UDC circuit" may be used to include frequency conversion circuitry (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC circuit" covers implementations where the UDC circuit 840 only includes circuit elements related to the TX path (e.g., only an upconversion mixer but not a downconversion mixer; in such implementations the UDC circuit may be used as/in an RF transmitter for generating RF signals for transmission), implementations where the UDC circuit 840 only includes circuit elements related to the RX path (e.g., only an downconversion mixer but not an upconversion mixer; in such implementations the UDC circuit 840 may be used as/in an RF receiver to downconvert received RF signals, e.g., the UDC circuit 840 may enable an antenna element of the phased array antenna 810 to act, or be used, as a receiver), as well as implementations where the UDC circuit 840 includes, both, circuit elements of the TX path and circuit elements of the RX path (e.g., both the upconversion mixer and the downconversion mixer; in such implementations the UDC circuit 840 may be used as/in an RF transceiver, e.g., the UDC circuit 840 may enable an antenna element of the phased array antenna 810 to act, or be used, as a transceiver).

Although a single UDC circuit 840 is illustrated in FIG. 8, multiple UDC circuits 840 may be included in the antenna apparatus 800 to provide upconverted RF signals to and/or receive RF signals to be downconverted from any one of the beamformers 822. Each UDC circuit 840 may be associated with a plurality of beamformers 822 of the beamformer array 820, e.g., using a splitter/combiner. This is schematically illustrated in FIG. 8 with dashed lines and dotted lines within the splitter/combiner connecting various elements of the beamformer array 820 and the UDC circuit 840. Namely, FIG. 8 illustrates that the dashed lines connect the downconverter circuit of the UDC circuit 840 (namely, the amplifier 842) to the RX paths of two different beamformers 822, and that the dotted lines connect the upconverter circuit of the UDC circuit 840 (namely, the amplifier 846) to the TX paths of two different beamformers 822. For example, there may be 96 beamformers 822 in the beamformer array 820, associated with 96 antenna elements 812 of the phased array antenna 810.

In some embodiments, the mixer 844 in the downconverter path (i.e., RX path) of the UDC circuit 840 may have at least two inputs and one output. One of the inputs of the mixer 844 may include an input from the amplifier 842, which may, e.g., be a low-noise amplifier (LNA). The second input of the mixer 844 may include an input indicative of the LO signal 860. In some embodiments, phase shifting may be implemented in the LO path (additionally or alternatively to the phase shifting in the RF path), in which case the LO signal 860 may be provided, first, to a phase shift module 850, and then a phase-shifted LO signal 860 is provided as the second input to the mixer 844. In the embodiments where phase shifting in the LO path is not implemented, the phase shift module 850 may be absent and the second input of the mixer 844 may be configured to receive the LO signal 860. The one output of the mixer 844 is an output to provide the downconverted signal 856, which may, e.g., be an IF signal 856. The mixer 844 may be configured to receive an RF RX signal from the RX path of one of the beamformers 822, after it has been amplified by the amplifier 842, at its first input and receive either a signal from the phase shift module 850 or the LO signal 860 itself at its second input, and mix these two signals to downconvert the RF RX signal to an lower frequency, producing the downconverted RX signal 856, e.g., the RX signal at the IF. Thus, the mixer 844 in the downconverter path of the UDC circuit 840 may be referred to as a "downconverting mixer."

In some embodiments, the mixer 848 in the upconverter path (i.e., TX path) of the UDC circuit 840 may have [at least] two inputs and one output. The first input of the mixer 848 may be an input for receiving a TX signal 858 of a lower frequency, e.g., the TX signal at IF. The second input of the mixer 848 may include an input indicative of the LO signal 860. In the embodiments where phase shifting is implemented in the LO path (either additionally or alternatively to the phase shifting in the RF path), the LO signal 860 may be provided, first, to a phase shift module 850, and then a phase-shifted LO signal 860 is provided as the second input to the mixer 848. In the embodiments where phase shifting in the LO path is not implemented, the phase shift module 850 may be absent and the second input of the mixer 848 may be configured to receive the LO signal 860. The one output of the mixer 848 is an output to the amplifier 846, which may, e.g., be a power amplifier (PA). The mixer 848 may be configured to receive an IF TX signal 858 (i.e., the lower frequency, e.g. IF, signal to be transmitted) at its first input and receive either a signal from the phase shift module 850 or the LO signal 860 itself at its second input, and mix these two signals to upconvert the IF TX signal to the desired RF frequency, producing the upconverted RF TX signal to be provided, after it has been amplified by the amplifier 846, to the TX path of one of the beamformers 822. Thus, the mixer 848 in the upconverter path of the UDC circuit 840 may be referred to as a "upconverting mixer."

In some embodiments, the amplifier 828 may be a PA and/or the amplifier 832 may be an LNA.

As is known in communications and electronic engineering, an IF is a frequency to which a carrier wave is shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 856 and 858 as IF signals, these descriptions are equally applicable to embodiments where signals 856 and 858 are baseband signals. In such embodiments, frequency mixing of the mixers 844 and 848 may be a zero-IF mixing (also referred to as a "zero-IF conversion") in which the LO signal 860 used to perform the mixing may have a center frequency in the band of RF RX/TX frequencies.

Although not specifically shown in FIG. 8, in further embodiments, the UDC circuit 840 may further include a balancer, e.g., in each of the TX and RX paths, configured to mitigate imbalances in the in-phase and quadrature (IQ) signals due to mismatching. Furthermore, although also not specifically shown in FIG. 8, in other embodiments, the antenna apparatus 800 may include further instances of a combination of the phased array antenna 810, the beamformer array 820, and the UDC circuit 840 as described herein.

The controller 870 may include any suitable device, configured to control operation of various parts of the antenna apparatus 800. For example, in some embodiments, the controller 870 may control the amount and the timing of phase shifting implemented in the antenna apparatus 800. In another example, in some embodiments, the controller 870 may control various signals, as well as the timing of those signals, provided to the antenna elements 812 implemented using the antenna structures 300, 400, 500, and/or 700 in the antenna array 810 to provide a wide scan range.

The antenna apparatus 800 can steer an electromagnetic radiation pattern of the phased array antenna 810 in a particular direction, thereby enabling the phased array antenna 810 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 800 can generate desired antenna patterns by providing phase shifter settings for the antenna elements 812, e.g., using the phase shifters of the beamformers 822 and/or the phase shift module 850.

EXAMPLES

Example 1 includes an antenna structure including a multi-layered printed circuit board (PCB); a folded magnetoelectric antenna element including a first portion disposed on a first layer of the multi-layered PCB and a first fold portion contiguous to the first portion and extending to at least a second layer of the multi-layered PCB; and a patch antenna element disposed on a third layer of the multi-layered PCB, where the first, second, and third layers are separate layers of the multi-layered PCB.

Example 2 includes the antenna structure of Example 1, where the folded magnetoelectric antenna element further includes a second fold portion contiguous to the first fold portion and disposed on the second layer of the multi-layered PCB.

Example 3 includes the antenna structure of any of Examples 1-2, where the second layer is between the first layer and the third layer, and where the first fold portion of the folded magnetoelectric antenna element further extends to the third layer of the multi-layered PCB.

Example 4 includes the antenna structure of any of Examples 1-3, where the folded magnetoelectric antenna element further includes a third fold portion contiguous to the first fold portion and disposed on the third layer of the multi-layered PCB.

Example 5 includes the antenna structure of any of Examples 1-4, where the first fold portion of the folded magnetoelectric antenna element extends along a side of the antenna structure.

Example 6 includes the antenna structure of any of Examples 1-5, where the folded magnetoelectric antenna element includes a plurality of folded patches spaced apart from each other, and where the first portion and the first fold portion correspond to a first folded patch of the plurality of folded patch.

Example 7 includes the antenna structure of any of Examples 1-6, where an outer edge of the first folded patch is folded to form the first fold portion.

Example 8 includes the antenna structure of any of Examples 1-6, where an inner edge of the first folded patch is folded to form the first fold portion.

Example 9 includes the antenna structure of any of Examples 1-6, where a second folded patch of the plurality of folded patches includes a second portion disposed on the first layer of the multi-layered PCB and a second fold portion contiguous to the second portion and extending to at least the second layer of the multi-layered PCB, and where an inner edge of the second folded patch is folded to form the second fold portion.

Example 10 includes the antenna structure of any of Examples 1-9, where the folded magnetoelectric antenna element is connected to a ground layer of the multi-layered PCB by at least two staggered vias.

Example 11 includes the antenna structure of any of Examples 1-10, where the at least two staggered vias that connect the folded magnetoelectric antenna element to the ground layer includes a first via extending from the first layer to the second layer; and a second via extending from the second layer to the ground layer.

Example 12 includes the antenna structure of any of Examples 1-11, where the patch antenna element includes a squared shape patch antenna, a rectangular shaped patch antenna, or a microstrip antenna.

Example 13 includes the antenna structure of any of Examples 1-12, and further include a first feeding port electrically coupled to the patch antenna element, where the first feeding port is associated with a first polarization; and a second feeding port electrically coupled to the patch antenna element, and where the second feeding port is associated with a second polarization different from the first polarization.

Example 14 includes a multi-layered printed circuit board (PCB) antenna device, including a plurality of PCB layers; a folded magnetoelectric antenna element including a plurality of patches disposed on a first PCB layer of the plurality of PCB layers and spaced apart from each other, where one or more edges of a first patch of the plurality of patches are folded and extend vertically towards a second PCB layer of the plurality of PCB layers, where the second PCB layer is vertically below the first PCB layer; a patch antenna element disposed on a third PCB layer of the plurality of PCB layers, where the third PCB layer is vertically below the second PCB layer; a first feeding port electrically coupled to the patch antenna element, where the first feeding port is associated with a first polarization; and a second feeding port electrically coupled to the patch antenna element, where the second feeding port is associated with a second polarization different from the first polarization.

Example 15 includes the multi-layered PCB antenna device of Example 14, where the one or more edges of the first patch that are folded further extends to the third PCB layer.

Example 16 includes the multi-layered PCB antenna device of any of Examples 14-15, where the one or more edges of the first patch that are folded includes at least one of an outer edge of the first patch or an inner edge of the first patch.

Example 17 includes the multi-layered PCB antenna device of any of Examples 14-16, where the one or more edges of the first patch that are folded includes the inner edge of the first patch, and where an inner edge of a second patch of the plurality of patches is folded and extends towards the second PCB layer.

Example 18 includes the multi-layered PCB antenna device of any of Examples 14-17, where a side dimension of the folded magnetoelectric antenna element is between 0.25 and 0.3 of a wavelength.

Example 19 includes the multi-layered PCB antenna device of any of Examples 14-18, where each of the plurality of patches of the folded magnetoelectric antenna element is electrically coupled to a ground layer of the plurality of PCB layers via two or more staggered PCB vias.

Example 20 includes the multi-layered PCB antenna device of any of Examples 14-19, where the plurality of PCB layers are spaced apart from each other by dielectric material having a dielectric constant between 3 and 4.

Example 21 includes the multi-layered PCB antenna device of any of Examples 14-20, where the third PCB layer and a ground layer of the plurality of PCB layers are spaced apart by a PCB core having height between 0.05 and 0.2 of a free-space wavelength.

Example 22 includes the multi-layered PCB antenna device of any of Examples 14-21, where the first, second, and third PCB layers are spaced apart from a fourth, fifth, and sixth PCB layers of the plurality of PCB layers by a PCB core.

Example 23 includes an antenna array apparatus including a plurality of antenna elements, where a first antenna element of the plurality of antenna elements includes a plurality of printed circuitry board (PCB) layers; a folded magnetoelectric antenna element including a plurality of patches disposed on a first PCB layer of the plurality of PCB layers and spaced apart from each other, where one or more edges of a first patch of the plurality of patches are folded and extend vertically towards a second PCB layer of the plurality of PCB layers, where the second PCB layer is vertically below the first PCB layer; and a patch antenna element disposed on a third PCB layer of the plurality of PCB layers, where the third PCB layer is vertically below the second PCB layer.

Example 24 includes the antenna array apparatus of Example 23, where the one or more edges of the first patch that are folded further extends to the third PCB layer.

Example 25 includes the antenna array apparatus of any of Examples 23-24, where the one or more edges of the first patch that are folded includes at least one of an outer edge of the first patch or an inner edge of the first patch.

Example 26 includes the antenna array apparatus of any of Examples 23-25, where the one or more edges of the first patch that are folded includes the inner edge of the first patch, and where an inner edge of a second patch of the plurality of patches is folded and extends towards the second PCB layer.

Example 27 includes the antenna array apparatus of any of Examples 23-26, where the first antenna element is housed in a surface mount technology (SMT) package.

Example 28 includes the antenna array apparatus of any of Examples 23-27, where the plurality of antenna elements provides a scan range including at least one of an azimuth scan angle up to 70 degrees or an elevation scan angle up to 70 degrees.

Variations and Implementations

While embodiments of the present disclosure were described above with references to exemplary implementations as shown in FIGS. 1-2, 3A-3B, 4A-4B, 5A-5F, 6, 7A-7B, and 8, a person skilled in the art will realize that the various teachings described above are applicable to a large variety of other implementations. For example, descriptions provided herein are applicable not only to 5G systems, which provide one example of wireless communication systems, but also to other wireless communication systems such as, but not limited to, Wi-Fi technology or Bluetooth technology. In yet another example, descriptions provided herein are applicable not only to wireless communication systems, but also to any other systems where antenna arrays may be used, such as radar systems.

In certain contexts, the features discussed herein can be applicable to automotive systems, medical systems, scientific instrumentation, wireless and wired communications, radio, radar, and digital-processing-based systems.

In the discussions of the embodiments above, components of a system, such as phase shifters, vias, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to providing compact, wideband antenna structures suitable for use in a wide scan angle antenna array as described herein.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors (DSPs), microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a SOC package, either in part, or in whole. An SOC represents an integrated circuit (IC) that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in the antenna arrangements of FIGS. 1-2, the antenna structures of FIGS. 3A-3B, 4A-4B, 5A-5F, 6, 7A-7B, and the apparatus f FIG. 8) have only been offered for purposes of example and teaching only. Such information may be varied considerably without departing from the spirit of the present disclosure. It should be appreciated that the system can be consolidated in any suitable manner. Along similar design alternatives, any of the illustrated circuits, components, modules, and elements of the present drawings may be combined in various possible configurations, all of which are clearly within the broad scope of this specification. In the foregoing description, example embodiments have been described with reference to particular component arrangements. Various modifications and changes may be made to such embodiments without departing from the scope of the present disclosure. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. An antenna structure, comprising:

a multi-layered printed circuit board (PCB);

a folded magnetoelectric antenna element including a first portion disposed on a first layer of the multi-layered PCB and a first fold portion contiguous to the first portion and extending to at least a second layer of the multi-layered PCB; and a patch antenna element disposed on a third layer of the multi-layered PCB, with the patch antenna element coupled with a first feeding element and a second feeding element configured to cause the patch antenna element to emanate electromagnetic field, wherein the first feeding element and the second feeding element are located symmetrically in the antenna structure;

wherein the first layer, the second layer, and the third layer are separate layers of the multi-layered PCB.

2. The antenna structure of claim 1, wherein the folded magnetoelectric antenna element further includes a second fold portion contiguous to the first fold portion and disposed on the second layer of the multi-layered PCB.

3. The antenna structure of claim 1, wherein the second layer is between the first layer and the third layer, and wherein the first fold portion of the folded magnetoelectric antenna element further extends to the third layer of the multi-layered PCB.

4. The antenna structure of claim 3, wherein the folded magnetoelectric antenna element further includes a third fold portion contiguous to the first fold portion and disposed on the third layer of the multi-layered PCB.

5. The antenna structure of claim 1, wherein the first fold portion of the folded magnetoelectric antenna element extends along a side of the antenna structure.

6. The antenna structure of claim 1, wherein the folded magnetoelectric antenna element includes a plurality of folded patches spaced apart from each other, and wherein the first portion and the first fold portion correspond to a first folded patch of the plurality of folded patches.

7. The antenna structure of claim 6, wherein an outer edge of the first folded patch is folded to form the first fold portion.

8. The antenna structure of claim 6, wherein an inner edge of the first folded patch is folded to form the first fold portion.

9. The antenna structure of claim 1, wherein the folded magnetoelectric antenna element is connected to a ground layer of the multi-layered PCB by at least two staggered vias.

10. The antenna structure of claim 1, further comprising:

a first feeding port electrically coupled to the patch antenna element by the first feeding element, wherein the first feeding port is associated with a first polarization; and a second feeding port electrically coupled to the patch antenna element by the second feeding element, and wherein the second feeding port is associated with a second polarization different from the first polarization.

11. A multi-layered printed circuit board (PCB) antenna device, comprising:

a plurality of PCB layers;

a folded magnetoelectric antenna element including a plurality of patches disposed on a first PCB layer of the plurality of PCB layers and spaced apart from each other, wherein one or more edges of a first patch of the plurality of patches are folded and extend vertically towards a second PCB layer of the plurality of PCB layers, wherein the second PCB layer is vertically below the first PCB layer, a patch antenna element disposed on a third PCB layer of the plurality of PCB layers, wherein the third PCB layer is vertically below the second PCB layer, with the patch antenna element coupled with a first feeding element and a second feeding element each configured to cause the patch antenna element to emanate electromagnetic field;

a first feeding port electrically coupled to the patch antenna element by the first feeding element, wherein the first feeding port is associated with a first polarization; and a second feeding port electrically coupled to the patch antenna element by the second feeding element, wherein the second feeding port is associated with a second polarization different from the first polarization;

wherein the first feeding element and the second feeding element are located symmetrically in the multi-layered PCB antenna device.

12. The multi-layered PCB antenna device of claim 11, wherein the one or more edges of the first patch that are folded includes at least one of an outer edge of the first patch or an inner edge of the first patch.

13. The multi-layered PCB antenna device of claim 11, wherein a side dimension of the folded magnetoelectric antenna element is between 0.25 and 0.3 of a wavelength.

14. The multi-layered PCB antenna device of claim 11, wherein each of the plurality of patches of the folded magnetoelectric antenna element is electrically coupled to a ground layer of the plurality of PCB layers via two or more staggered PCB vias.

15. The multi-layered PCB antenna device of claim 11, wherein the plurality of PCB layers are spaced apart from each other by dielectric material having a dielectric constant between 3 and 4.

16. The multi-layered PCB antenna device of claim 11, wherein the third PCB layer and a ground layer of the plurality of PCB layers are spaced apart by a PCB core having height between 0.05 and 0.2 of a free-space wavelength.

17. The multi-layered PCB antenna device of claim 11, wherein the first PCB layer, the second PCB layer, and the third PCB layer are spaced apart from a fourth, fifth, and sixth PCB layers of the plurality of PCB layers by a PCB core.

18. An antenna array apparatus comprising:

a plurality of antenna elements, wherein a first antenna element of the plurality of antenna elements comprises:

a plurality of printed circuitry board (PCB) layers;

a folded magnetoelectric antenna element including a plurality of patches disposed on a first PCB layer of the plurality of PCB layers and spaced apart from each other, wherein one or more edges of a first patch of the plurality of patches are folded and extend vertically towards a second PCB layer of the plurality of PCB layers, wherein the second PCB layer is vertically below the first PCB layer; and a patch antenna element disposed on a third PCB layer of the plurality of PCB layers, wherein the third PCB layer is vertically below the second PCB layer with the patch antenna element coupled with a first feeding element and a second feeding element configured to cause the patch antenna element to emanate electromagnetic field, wherein the first feeding element and the second feeding element are located symmetrically in the antenna array apparatus.

19. The antenna array apparatus of claim 18, wherein the first antenna element is housed in a surface mount technology (SMT) package.

20. The antenna array apparatus of claim 18, wherein the plurality of antenna elements provides a scan range including at least one of an azimuth scan angle up to 70 degrees or an elevation scan angle up to 70 degrees.

* * * * *